United States Patent
Lee et al.

(10) Patent No.: US 12,058,678 B2
(45) Date of Patent: Aug. 6, 2024

(54) METHOD AND APPARATUS FOR RESOURCE ALLOCATION IN WIRELESS COMMUNICATION SYSTEM

(71) Applicant: LG ELECTRONICS INC., Seoul (KR)

(72) Inventors: Youngdae Lee, Seoul (KR); Taehun Kim, Seoul (KR); Jongwoo Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 633 days.

(21) Appl. No.: 17/283,756

(22) PCT Filed: Oct. 24, 2019

(86) PCT No.: PCT/KR2019/014033
§ 371 (c)(1),
(2) Date: Apr. 8, 2021

(87) PCT Pub. No.: WO2020/091303
PCT Pub. Date: May 7, 2020

(65) Prior Publication Data
US 2021/0385805 A1    Dec. 9, 2021

Related U.S. Application Data

(60) Provisional application No. 62/754,561, filed on Nov. 1, 2018.

(51) Int. Cl.
*H04W 4/00*     (2018.01)
*H04W 72/20*    (2023.01)
(Continued)

(52) U.S. Cl.
CPC .......... *H04W 72/20* (2023.01); *H04W 72/23* (2023.01); *H04W 72/52* (2023.01)

(58) Field of Classification Search
CPC ... H04W 28/04; H04W 72/04; H04W 72/042; H04W 88/08; H04W 28/08;
(Continued)

(56) References Cited

U.S. PATENT DOCUMENTS 11,706,763 B2 *  7/2023  Chen ..................... H04W 72/20
                                                       709/226
2015/0079906 A1  3/2015  Koo et al.
(Continued)

FOREIGN PATENT DOCUMENTS

CA    2985543 C  *  9/2023  ........ H04W 28/0278
EP    4274351 A1 *  11/2023  ........... H04W 28/02
(Continued)

OTHER PUBLICATIONS

CN 105472740, Wu et al, A device to device information notification method, user terminal and base station, Apr. 6, 2016, FIT, pp. 1-41. (Year: 2016).*

(Continued)

*Primary Examiner* — Phuongchau Ba Nguyen
(74) *Attorney, Agent, or Firm* — LEE, HONG, DEGERMAN, KANG & WAIMEY

(57) ABSTRACT

A method performed by a first wireless device in a wireless communication system including receiving, from a second first wireless device, a first message comprising information for requesting a resource allocation to the second wireless device; transmitting, to a network, a second message comprising a resource request for the second wireless device, the resource request comprising the information and an identifier (ID) of the second wireless device allocated by the first wireless device; receiving, from the network, a third message comprising a resource configuration for the second wireless device, the resource configuration comprising information for a resource for the second wireless device (Continued)

related to the resource request, and the ID of the second wireless device; and transmitting, to the second wireless device, a fourth message comprising the resource configuration related to the ID of the second wireless device.

13 Claims, 15 Drawing Sheets

(51) Int. Cl.
*H04W 72/23* (2023.01)
*H04W 72/52* (2023.01)

(58) Field of Classification Search
CPC ... H04W 28/084; H04W 36/22; H04W 72/12; H04W 72/20; H04W 72/23; H04W 72/52; H04W 88/04; H04W 92/18; H04L 5/0007
See application file for complete search history.

(56) References Cited

U.S. PATENT DOCUMENTS

| | | |
|---|---|---|
| 2018/0048994 A1 | 2/2018 | Kwon et al. |
| 2018/0199312 A1 | 7/2018 | Wu et al. |
| 2022/0150872 A1* | 5/2022 | Park .................. H04W 92/18 |
| 2023/0117472 A1* | 4/2023 | Ko .................... H04L 5/0055 |
| | | 370/329 |

FOREIGN PATENT DOCUMENTS

| | | | |
|---|---|---|---|
| WO | WO-2016181094 A1 * | 11/2016 | ........ H04W 28/0278 |
| WO | 2017159451 | 9/2017 | |

OTHER PUBLICATIONS

Huawei, "Study sidelink resource allocation mechanism," 3GPP TSG-RAN WG2 Meeting #103bis, R2-1815199, Oct. 2018, 4 pages.

* cited by examiner

METHOD AND APPARATUS FOR RESOURCE ALLOCATION IN WIRELESS COMMUNICATION SYSTEM

CROSS-REFERENCE TO RELATED APPLICATIONS

This application is the National Stage filing under 35 U.S.C. 371 of International Application No. PCT/KR2019/014033, filed on Oct. 24, 2019, which claims the benefit of U.S. Provisional Application No. 62/754,561 filed on Nov. 1, 2018, the contents of which are all hereby incorporated by reference herein in their entirety.

BACKGROUND OF THE DISCLOSURE

Field of the Disclosure

The present disclosure relates to method and apparatus for resource allocation in wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

For a user equipment (UE) to transmit a signal, the UE need to request a resource allocation, and receive the resource allocation. For example, if the UE intends to perform an uplink transmission, the UE need to transmit a scheduling request (SR) and a buffer status report (BSR) to a network, and receive an uplink scheduling downlink control information (DCI) allocating an uplink resource. For another example, if the UE intends to perform a transmission in a sidelink, the UE need to transmit a resource request to a peer UE performing a sidelink communication with the UE, and receive a resource allocation from the network via the peer UE.

SUMMARY OF THE DISCLOSURE

Technical Problem

An aspect of the present disclosure is to provide method and apparatus for resource allocation in wireless communication system.

Another aspect of the present disclosure is to provide method and apparatus for resource allocation to UE performing a sidelink communication in wireless communication system.

Yet another aspect of the present disclosure is to provide method and apparatus for resource allocation to UE performing a sidelink communication which is not identified to a network in wireless communication system.

Technical Solution

According to an embodiment of the present disclosure, a method performed by a first wireless device in a wireless communication system comprises: receiving, from a second first wireless device, a first message comprising information for requesting a resource allocation to the second wireless device; transmitting, to a network, a second message comprising a resource request for the second wireless device, the resource request comprising the information and an identifier (ID) of the second wireless device allocated by the first wireless device; receiving, from the network, a third message comprising a resource configuration for the second wireless device, the resource configuration comprising information for a resource for the second wireless device related to the resource request, and the ID of the second wireless device; and transmitting, to the second wireless device, a fourth message comprising the resource configuration related to the ID of the second wireless device.

According to an embodiment of the present disclosure, a first wireless device in a wireless communication system comprises: a memory; a transceiver; and at least one processor, operatively coupled to the memory and the transceiver. The at least one processor is configured to receive, from a second wireless device, a first message comprising information for requesting a resource allocation to the second wireless device, transmit, to a network, a second message comprising a resource request for the second wireless device, the resource request comprising the information and an identifier (ID) of the second wireless device allocated by the first wireless device, receive, from the network, a third message comprising a resource configuration for the second wireless device, the resource configuration comprising information for a resource for the second wireless device related to the resource request, and the ID of the second wireless device, and transmit, to the second wireless device, a fourth message comprising the resource configuration related to the ID of the second wireless device.

Advantageous Effect

The present disclosure can have various advantageous effects.

For example, a relay wireless device allocates an identifier (ID) of a UE and forwards a resource request received from the UE along with the ID to a network so that the network can allocate resources to the UE via the wireless device, even though the UE and/or a context of the UE is not identifier to the network.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DESCRIPTION OF EXEMPLARY EMBODIMENTS

Figure 1:
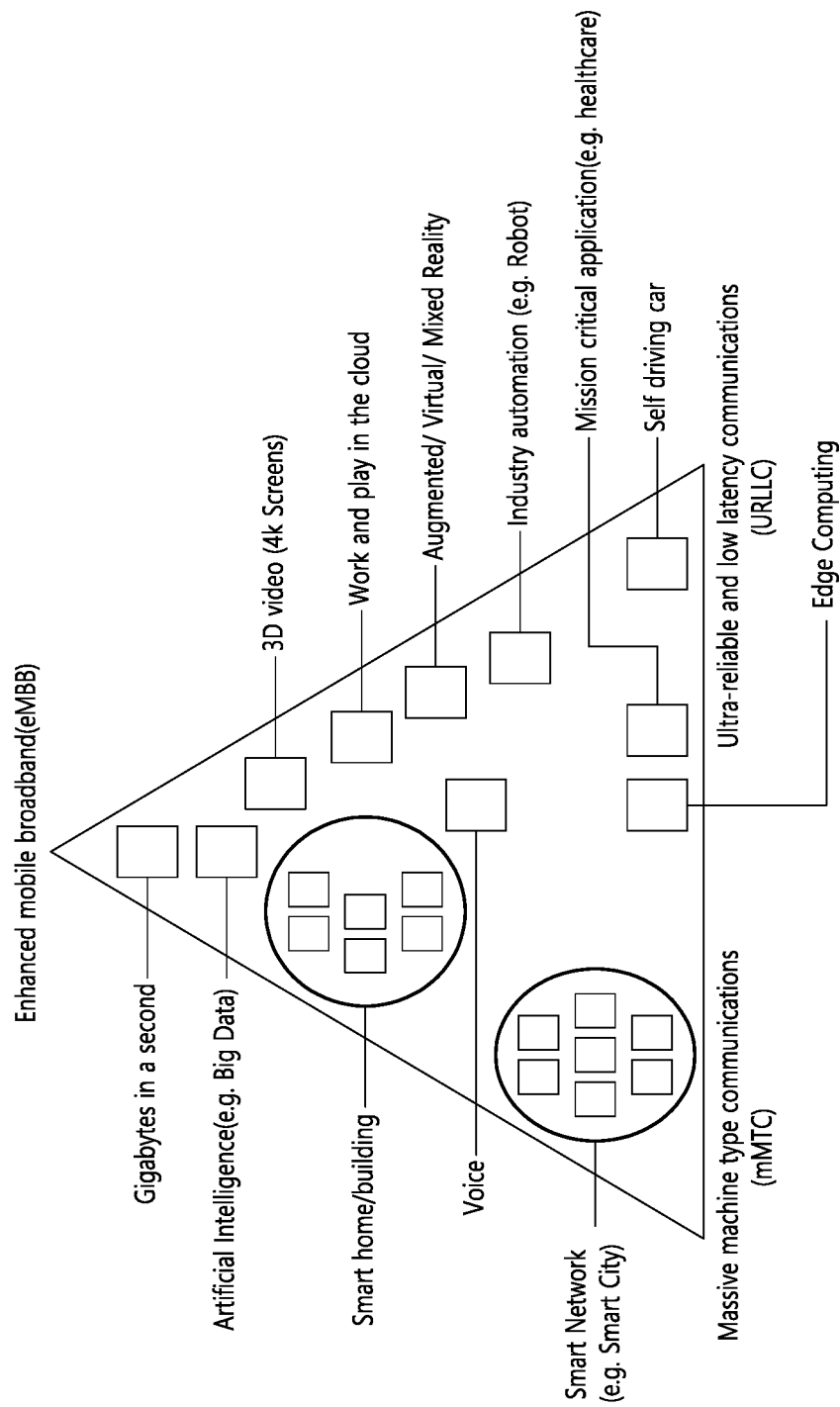
FIG. 1 shows examples of 5G usage scenarios to which the technical features of the present disclosure can be applied.

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (UL). For example, only OFDMA may be used for DL and only SC-FDMA may be used for UL. Alternatively, OFDMA and SC-FDMA may be used for DL and/or UL.

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A, B, C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

FIG. 1 shows examples of 5G usage scenarios to which the technical features of the present disclosure can be applied.

The 5G usage scenarios shown in FIG. 1 are only exemplary, and the technical features of the present disclosure can be applied to other 5G usage scenarios which are not shown in FIG. 1.

Referring to FIG. 1, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km2. mMTC allows seamless integration of embedded sensors in all areas and is one of the most widely used 5G applications. Potentially by 2020, internet-of-things (IoT) devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drones control and coordination.

Next, a plurality of use cases included in the triangle of FIG. 1 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g. devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time high-definition (HD) video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

NR supports multiple numerology (or, subcarrier spacing (SCS)) to support various 5G services. For example, when the SCS is 15 kHz, wide area in traditional cellular bands may be supported. When the SCS is 30 kHz/60 kHz, dense-urban, lower latency and wider carrier bandwidth may be supported. When the SCS is 60 kHz or higher, a bandwidth greater than 24.25 GHz may be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Figure 2:
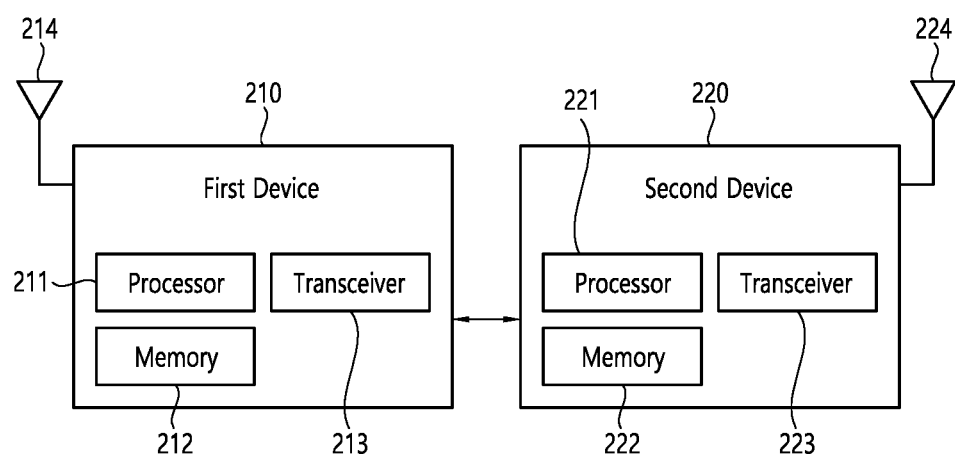
FIG. 2 shows an example of a wireless communication system to which the technical features of the present disclosure can be applied.

FIG. 2 shows an example of a wireless communication system to which the technical features of the present disclosure can be applied. Referring to FIG. 2, the wireless communication system may include a first device 210 and a second device 220.

The first device 210 includes a base station, a network node, a transmitting UE, a receiving UE, a wireless device, a wireless communication device, a vehicle, a vehicle equipped with an autonomous driving function, a connected car, a drone, an unmanned aerial vehicle (UAV), an artificial intelligence (AI) module, a robot, an AR device, a VR device, a mixed reality (MR) device, a hologram device, a public safety device, an MTC device, an IoT device, a medical device, a fin-tech device (or, a financial device), a security device, a climate/environmental device, a device related to 5G services, or a device related to the fourth industrial revolution.

The second device 220 includes a base station, a network node, a transmitting UE, a receiving UE, a wireless device, a wireless communication device, a vehicle, a vehicle equipped with an autonomous driving function, a connected car, a drone, a UAV, an AI module, a robot, an AR device, a VR device, an MR device, a hologram device, a public safety device, an MTC device, an IoT device, a medical device, a fin-tech device (or, a financial device), a security device, a climate/environmental device, a device related to 5G services, or a device related to the fourth industrial revolution.

For example, the UE may include a mobile phone, a smart phone, a laptop computer, a digital broadcasting terminal, a personal digital assistant (PDA), a portable multimedia player (PMP), a navigation device, a slate personal computer (PC), a tablet PC, an ultrabook, a wearable device (e.g. a smartwatch, a smart glass, a head mounted display (HMD)). For example, the HMD may be a display device worn on the head. For example, the HMD may be used to implement AR, VR and/or MR.

For example, the drone may be a flying object that is flying by a radio control signal without a person boarding it. For example, the VR device may include a device that implements an object or background in the virtual world. For example, the AR device may include a device that implements connection of an object and/or a background of a virtual world to an object and/or a background of the real world. For example, the MR device may include a device that implements fusion of an object and/or a background of a virtual world to an object and/or a background of the real world. For example, the hologram device may include a device that implements a 360-degree stereoscopic image by recording and playing stereoscopic information by utilizing a phenomenon of interference of light generated by the two laser lights meeting with each other, called holography. For example, the public safety device may include a video relay device or a video device that can be worn by the user's body. For example, the MTC device and the IoT device may be a device that do not require direct human intervention or manipulation. For example, the MTC device and the IoT device may include a smart meter, a vending machine, a thermometer, a smart bulb, a door lock and/or various sensors. For example, the medical device may be a device used for the purpose of diagnosing, treating, alleviating, handling, or preventing a disease. For example, the medical device may be a device used for the purpose of diagnosing, treating, alleviating, or correcting an injury or disorder. For example, the medical device may be a device used for the purpose of inspecting, replacing or modifying a structure or function. For example, the medical device may be a device used for the purpose of controlling pregnancy. For example, the medical device may include a treatment device, a surgical device, an (in vitro) diagnostic device, a hearing aid and/or a procedural device, etc. For example, a security device may be a device installed to prevent the risk that may occur and to maintain safety. For example, the security device may include a camera, a closed-circuit TV (CCTV), a recorder, or a black box. For example, the fin-tech device may be a device capable of providing financial services such as mobile payment. For example, the fin-tech device may include a payment device or a point of sales (POS). For example, the climate/environmental device may include a device for monitoring or predicting the climate/environment.

The first device 210 may include at least one or more processors, such as a processor 211, at least one memory, such as a memory 212, and at least one transceiver, such as a transceiver 213. The processor 211 may perform the functions, procedures, and/or methods of the present disclosure described below. The processor 211 may perform one or more protocols. For example, the processor 211 may perform one or more layers of the air interface protocol. The memory 212 is connected to the processor 211 and may store various types of information and/or instructions. The transceiver 213 is connected to the processor 211 and may be controlled to transmit and receive wireless signals.

The second device 220 may include at least one or more processors, such as a processor 221, at least one memory, such as a memory 222, and at least one transceiver, such as a transceiver 223. The processor 221 may perform the functions, procedures, and/or methods of the present disclosure described below. The processor 221 may perform one or more protocols. For example, the processor 221 may perform one or more layers of the air interface protocol. The memory 222 is connected to the processor 221 and may store various types of information and/or instructions. The transceiver 223 is connected to the processor 221 and may be controlled to transmit and receive wireless signals.

The memory 212, 222 may be connected internally or externally to the processor 211, 212, or may be connected to other processors via a variety of technologies such as wired or wireless connections.

The first device 210 and/or the second device 220 may have more than one antenna. For example, antenna 214 and/or antenna 224 may be configured to transmit and receive wireless signals.

Figure 3:
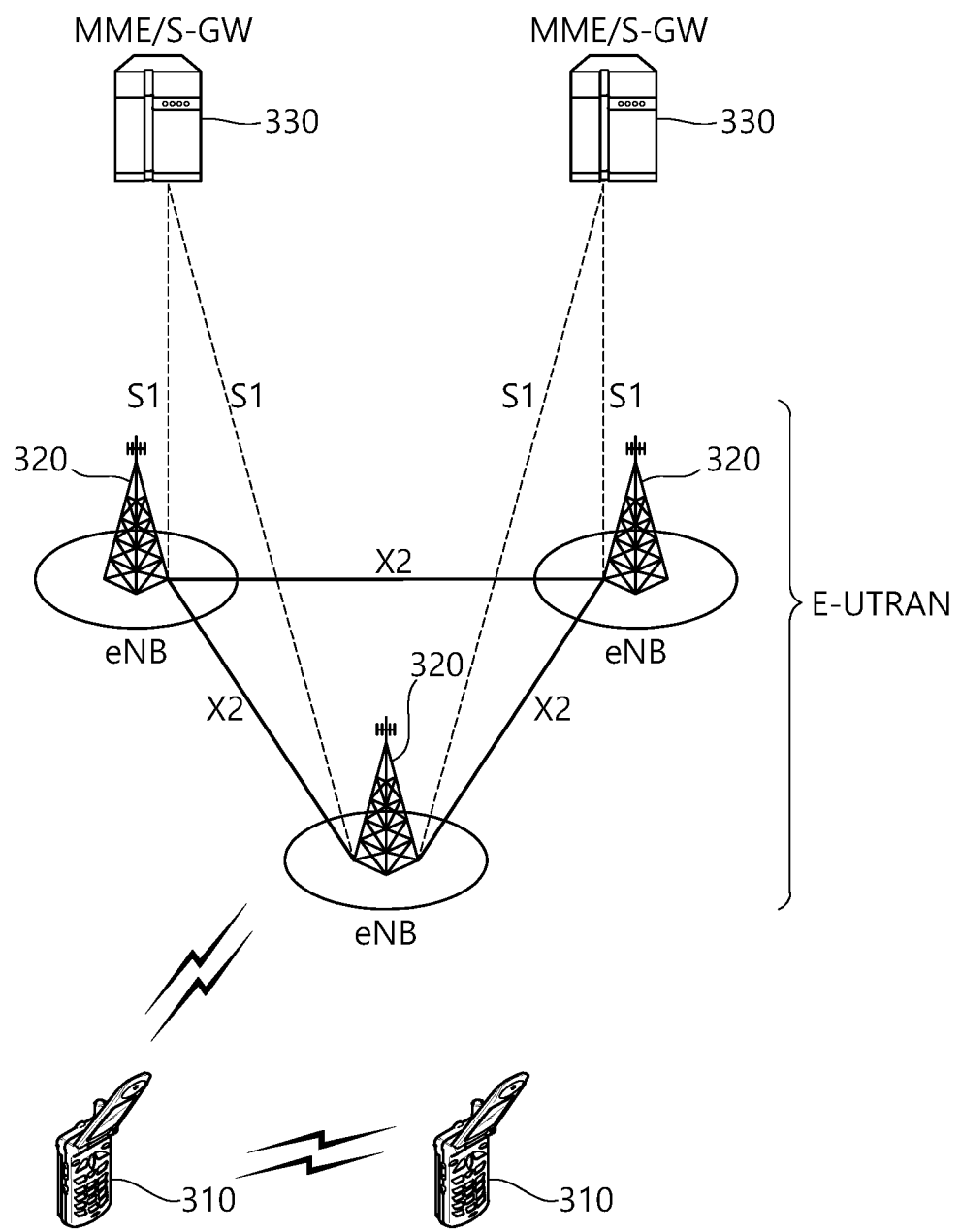
FIG. 3 shows an example of a wireless communication system to which the technical features of the present disclosure can be applied.

FIG. 3 shows an example of a wireless communication system to which the technical features of the present disclosure can be applied.

Specifically, FIG. 3 shows a system architecture based on an evolved-UMTS terrestrial radio access network (E-UTRAN). The aforementioned LTE is a part of an evolved-UTMS (e-UMTS) using the E-UTRAN.

Referring to FIG. 3, the wireless communication system includes one or more user equipment (UE) 310, an E-UTRAN and an evolved packet core (EPC). The UE 310 refers to a communication equipment carried by a user. The UE 310 may be fixed or mobile. The UE 310 may be referred to as another terminology, such as a mobile station (MS), a user terminal (UT), a subscriber station (SS), and/or a wireless device, etc.

The E-UTRAN consists of one or more evolved NodeB (eNB) 320. The eNB 320 provides the E-UTRA user plane and control plane protocol terminations towards the UE 10. The eNB 320 is generally a fixed station that communicates with the UE 310. The eNB 320 hosts the functions, such as inter-cell radio resource management (RRM), radio bearer (RB) control, connection mobility control, radio admission control, measurement configuration/provision, dynamic resource allocation (scheduler), etc. The eNB 320 may be referred to as another terminology, such as a base station (BS), a base transceiver system (BTS), an access point (AP), etc.

A downlink (DL) denotes communication from the eNB 320 to the UE 310. An uplink (UL) denotes communication from the UE 310 to the eNB 320. A sidelink (SL) denotes communication between the UEs 310. In the DL, a transmitter may be a part of the eNB 320, and a receiver may be a part of the UE 310. In the UL, the transmitter may be a part of the UE 310, and the receiver may be a part of the eNB 320. In the SL, the transmitter and receiver may be a part of the UE 310.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 330 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 310 is connected to the eNB 320 by means of the Uu interface. The UEs 310 are interconnected with each other by means of the PC5 interface. The eNBs 320 are interconnected with each other by means of the X2 interface. The eNBs 320 are also connected by means of the S1 interface to the EPC, more specifically to the MME by means of the S1-MME interface and to the S-GW by means of the S1-U interface. The S1 interface supports a many-to-many relation between MMEs/S-GWs and eNBs.

Figure 4:
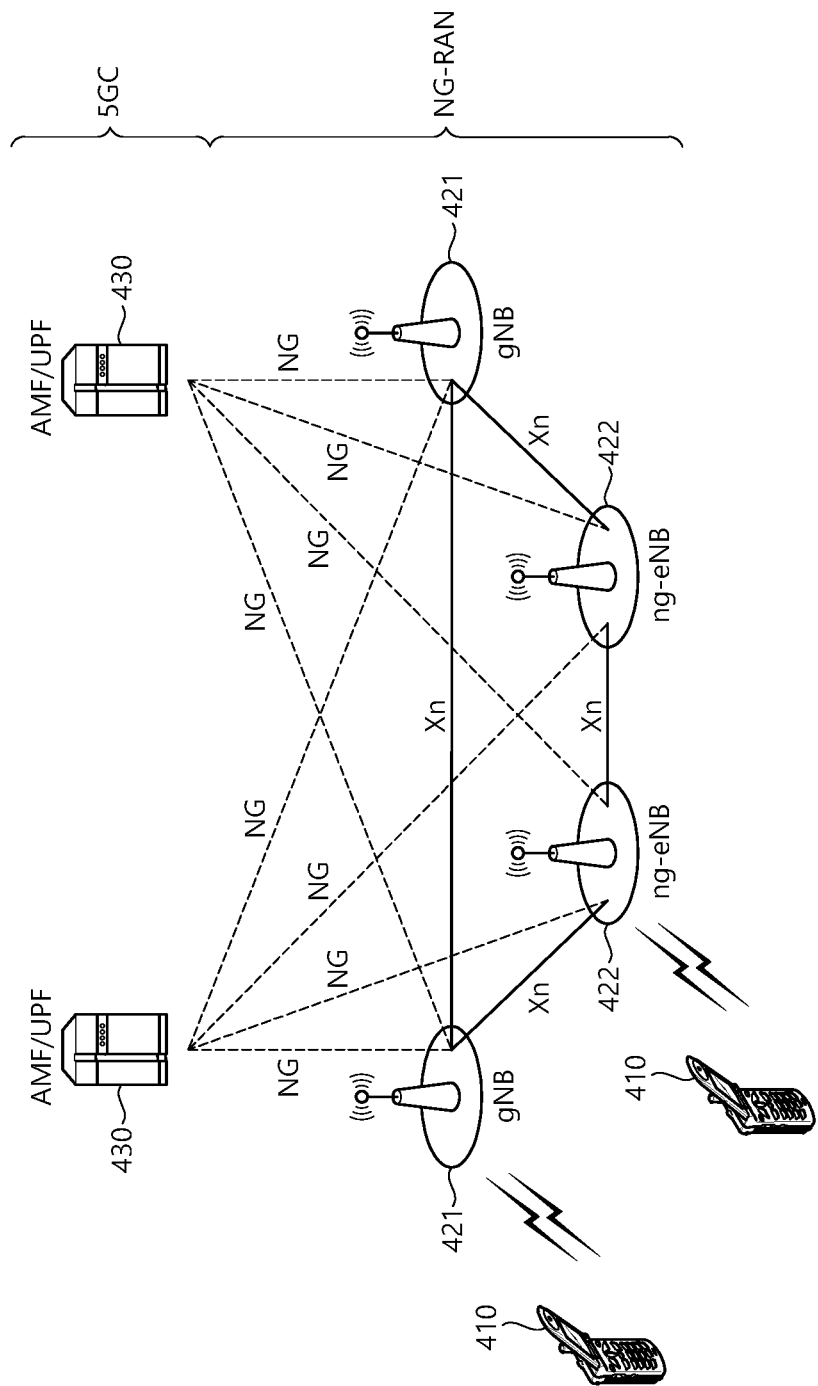
FIG. 4 shows another example of a wireless communication system to which the technical features of the present disclosure can be applied.

FIG. 4 shows another example of a wireless communication system to which the technical features of the present disclosure can be applied.

Specifically, FIG. 4 shows a system architecture based on a 5G NR. The entity used in the 5G NR (hereinafter, simply referred to as "NR") may absorb some or all of the functions of the entities introduced in FIG. 3 (e.g. eNB, MME, S-GW). The entity used in the NR may be identified by the name "NG" for distinction from the LTE/LTE-A.

Referring to FIG. 4, the wireless communication system includes one or more UE 410, a next-generation RAN (NG-RAN) and a 5th generation core network (5GC). The NG-RAN consists of at least one NG-RAN node. The NG-RAN node is an entity corresponding to the eNB 320 shown in FIG. 3. The NG-RAN node consists of at least one gNB 421 and/or at least one ng-eNB 422. The gNB 421 provides NR user plane and control plane protocol terminations towards the UE 410. The ng-eNB 422 provides E-UTRA user plane and control plane protocol terminations towards the UE 410.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs 421 and ng-eNBs 422 are interconnected with each other by means of the Xn interface. The gNBs 421 and ng-eNBs 422 are also connected by means of the NG interfaces to the 5GC, more specifically to the AMF by means of the NG-C interface and to the UPF by means of the NG-U interface.

A protocol structure between network entities described above is described. On the system of FIG. 3 and/or FIG. 4, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

Figure 5:
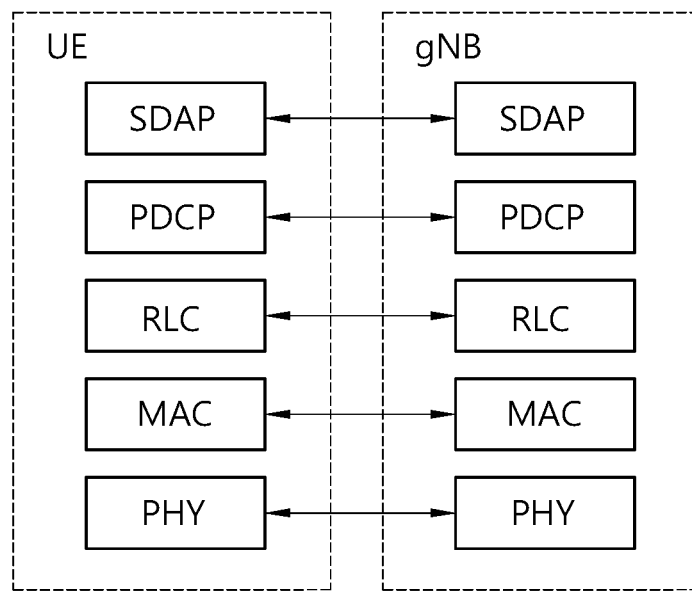
FIG. 5 shows a block diagram of a user plane protocol stack to which the technical features of the present disclosure can be applied.
Figure 6:
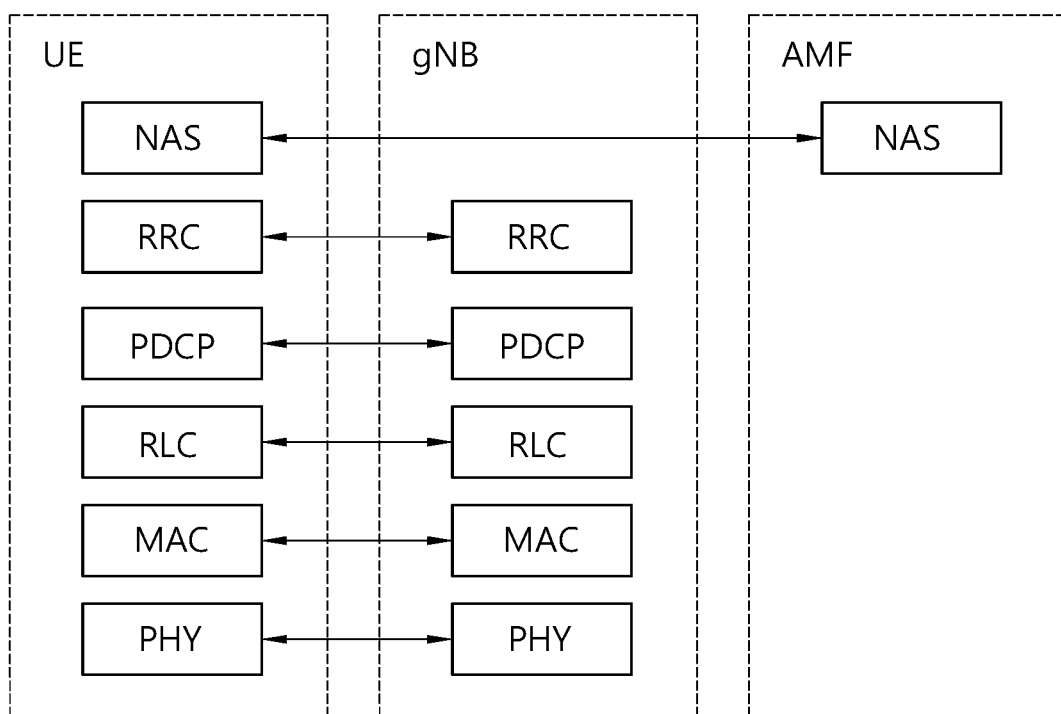
FIG. 6 shows a block diagram of a control plane protocol stack to which the technical features of the present disclosure can be applied.

FIG. 5 shows a block diagram of a user plane protocol stack to which the technical features of the present disclosure can be applied. FIG. 6 shows a block diagram of a control plane protocol stack to which the technical features of the present disclosure can be applied.

The user/control plane protocol stacks shown in FIG. 5 and FIG. 6 are used in NR. However, user/control plane protocol stacks shown in FIG. 5 and FIG. 6 may be used in LTE/LTE-A without loss of generality, by replacing gNB/AMF with eNB/MME.

Referring to FIG. 5 and FIG. 6, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/demultiplexing of MAC service data units (SDUs) belonging to one or different logical channels into/from transport blocks (TB) delivered to/from the physical layer on transport channels, scheduling information reporting, error correction through hybrid automatic repeat request (HARD), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the BS.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

The physical channels may be modulated according to OFDM processing and utilizes time and frequency as radio resources. The physical channels consist of a plurality of orthogonal frequency division multiplexing (OFDM) symbols in time domain and a plurality of subcarriers in frequency domain. One subframe consists of a plurality of OFDM symbols in the time domain. A resource block is a resource allocation unit, and consists of a plurality of OFDM symbols and a plurality of subcarriers. In addition, each subframe may use specific subcarriers of specific OFDM symbols (e.g. first OFDM symbol) of the corresponding subframe for a physical downlink control channel (PDCCH), i.e. L1/L2 control channel. A transmission time interval (TTI) is a basic unit of time used by a scheduler for resource allocation. The TTI may be defined in units of one or a plurality of slots, or may be defined in units of mini-slots.

The transport channels are classified according to how and with what characteristics data are transferred over the radio interface. DL transport channels include a broadcast channel (BCH) used for transmitting system information, a downlink shared channel (DL-SCH) used for transmitting user traffic or control signals, and a paging channel (PCH) used for paging a UE. UL transport channels include an uplink shared channel (UL-SCH) for transmitting user traffic or control signals and a random access channel (RACH) normally used for initial access to a cell.

Different kinds of data transfer services are offered by MAC sublayer. Each logical channel type is defined by what type of information is transferred. Logical channels are classified into two groups: control channels and traffic channels.

Control channels are used for the transfer of control plane information only. The control channels include a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications. The CCCH is a channel for transmitting control information between UEs and network. This channel is used for UEs having no RRC connection with the network. The DCCH is a point-to-point bi-directional channel that transmits dedicated control information between a UE and the network. This channel is used by UEs having an RRC connection.

Traffic channels are used for the transfer of user plane information only. The traffic channels include a dedicated traffic channel (DTCH). The DTCH is a point-to-point channel, dedicated to one UE, for the transfer of user information. The DTCH can exist in both UL and DL.

Regarding mapping between the logical channels and transport channels, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH. In UL, CCCH can be mapped to UL-SCH, DCCH can be mapped to UL-SCH, and DTCH can be mapped to UL-SCH.

Figure 7:
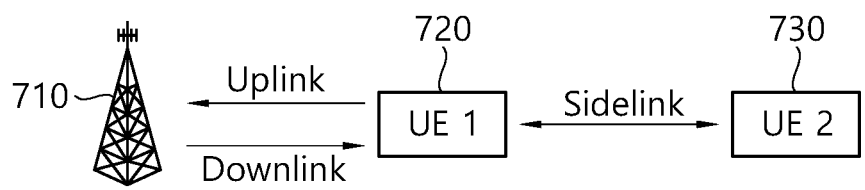
FIG. 7 shows an example of communication links to which technical features of the present disclosure can be applied.

FIG. 7 shows an example of communication links to which technical features of the present disclosure can be applied.

Referring to FIG. 7, the communication links comprise uplink, downlink, and sidelink. The uplink is a communication interface from a UE (e.g., UE 720) to a base station (e.g., base station 710, such as eNB and/or gNB). The downlink is a communication interface from a base station (e.g., base station 710) to a UE (e.g., UE 720).

The sidelink is UE to UE interface for sidelink communication, sidelink discovery and/or V2X (vehicle to everything) communication. For example, the sidelink may correspond to a PC5 interface for sidelink communication, sidelink discovery and/or V2X sidelink communication.

A UE may perform a communication via network infrastructure. For example, as shown in FIG. 7, the UE1 720 may perform an uplink transmission and/or receive a downlink transmission, via the base station 710.

Also, a UE may perform a communication directly with a peer UE without using the network infrastructure. For example, as shown in FIG. 7, the UE1 720 may perform a direct communication with the UE2 730 via sidelink, without a support of the network infrastructure such as base station 710.

The sidelink communication and associated synchronization resource configuration applies for the frequency at which the sidelink communication and/or associated synchronization resource configuration was received/acquired. Moreover, for a UE configured with one or more secondary cells (SCells), the sidelink communication and associated synchronization resource configuration provided by dedicated signalling applies for the primary cell (PCell) and/or the primary frequency. The sidelink discovery and associated synchronization resource configuration applies for the frequency at which the sidelink discovery and/or the associated synchronization resource configuration was received/acquired or the indicated frequency in the configuration. For a UE configured with one or more SCells, the sidelink discovery and associated synchronization resource configuration provided by dedicated signalling applies for the PCell/the primary frequency/any other indicated frequency.

According to various embodiments, upper layers configure the UE to receive or transmit sidelink communication on a specific frequency, to monitor or transmit non-public safety (PS) related sidelink discovery announcements on one or more frequencies or to monitor or transmit PS related sidelink discovery announcements on a specific frequency, but only if the UE is authorized to perform these particular proximity service (ProSe) related sidelink activities.

According to various embodiments, it is up to UE implementation which actions to take (e.g. termination of unicast services, detach) when it is unable to perform the desired sidelink activities, e.g. due to UE capability limitations.

Sidelink communication comprises one-to-many and one-to-one sidelink communication. One-to-many sidelink communication comprises relay related and non-relay related one-to-many sidelink communication. One-to-one sidelink communication comprises relay related and non-relay related one-to-one sidelink communication. In relay related one-to-one sidelink communication the communicating parties comprise one sidelink relay UE and one sidelink remote UE.

Sidelink discovery comprises public safety related (PS related) and non-PS related sidelink discovery. PS related sidelink discovery comprises relay related and non-relay related PS related sidelink discovery. Upper layers indicate to RRC whether a particular sidelink announcement is PS related or non-PS related.

According to various embodiments, upper layers indicate to radio resource control (RRC) whether a particular sidelink procedure is V2X related or not.

According to various embodiments, the UE shall perform V2X sidelink communication operation if at least one of the following conditions 1)-3) is met:

Condition 1) if the UE's serving cell is suitable (RRC_IDLE or RRC_CONNECTED); and if either the selected cell on the frequency used for V2X sidelink communication operation belongs to the registered or equivalent public land mobile network (PLMN) as specified in 3GPP TS 24.334 or the UE is out of coverage on the frequency used for V2X sidelink communication operation as defined in 3GPP TS36.304;

Condition 2) if the UE's serving cell (for RRC_IDLE or RRC_CONNECTED) fulfils the conditions to support V2X sidelink communication in limited service state as specified in 3GPP TS 23.285; and if either the serving cell is on the frequency used for V2X sidelink communication operation or the UE is out of coverage on the frequency used for V2X sidelink communication operation as defined in 3GPP TS 36.304; or Condition 3) if the UE has no serving cell (RRC_IDLE).

Figure 8:
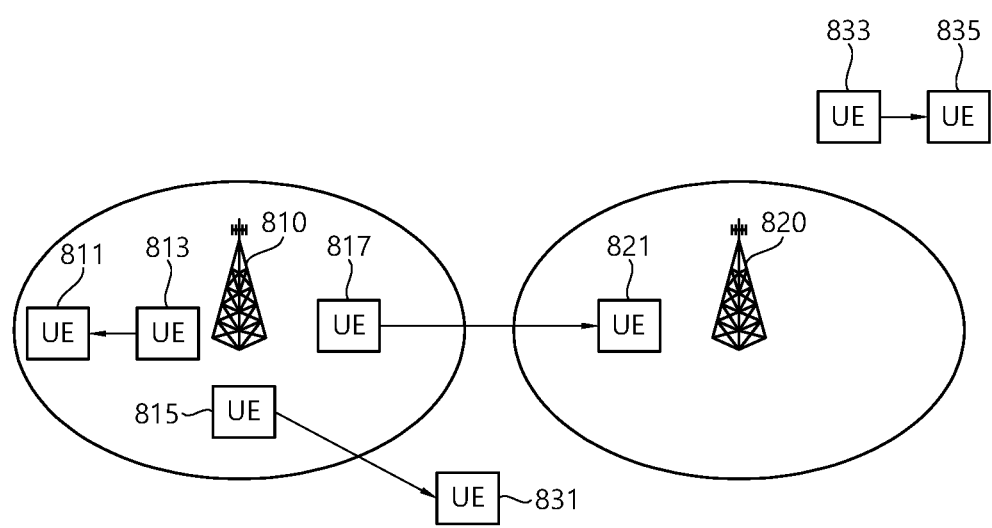
FIG. 8 shows an example of sidelink connectivity types to which technical features of the present disclosure can be applied.

FIG. 8 shows an example of sidelink connectivity types to which technical features of the present disclosure can be applied.

Referring to FIG. 8, a sidelink connectivity between UE 811 and UE 813 may be "in-coverage", where the two UEs UE 811 and UE 813 are under a coverage of a network (e.g., base station 810). Also, the sidelink connectivity between the UE 811 and the UE 813 may be in-coverage of intra-cell type, as the UE 811 receiving a sidelink transmission is within a same cell as the UE 813 transmitting the sidelink transmission.

A sidelink connectivity between UE 817 and UE 821 may be also in-coverage, as the two UEs 817 and 821 are under a coverage of a network. However, unlike the case of the UE 811 and the UE 813, the sidelink connectivity between the UE 817 and the UE 821 may be in-coverage of inter-cell type, as the UE 821 receiving a sidelink transmission is within a cell coverage of a base station 820 while the UE 817 transmitting the sidelink transmission is within a cell coverage of a base station 810.

A sidelink connectivity between UE 815 and UE 831 may be "partial-coverage", where one of the two UEs (e.g., UE 815) is under a coverage of a network while the other UE (e.g., UE 831) is outside the coverage of the network.

A sidelink connectivity between UE 833 and UE 835 may be "out-of-coverage", where the two UEs UE 833 and UE 835 are outside a coverage of a network.

Figure 9:
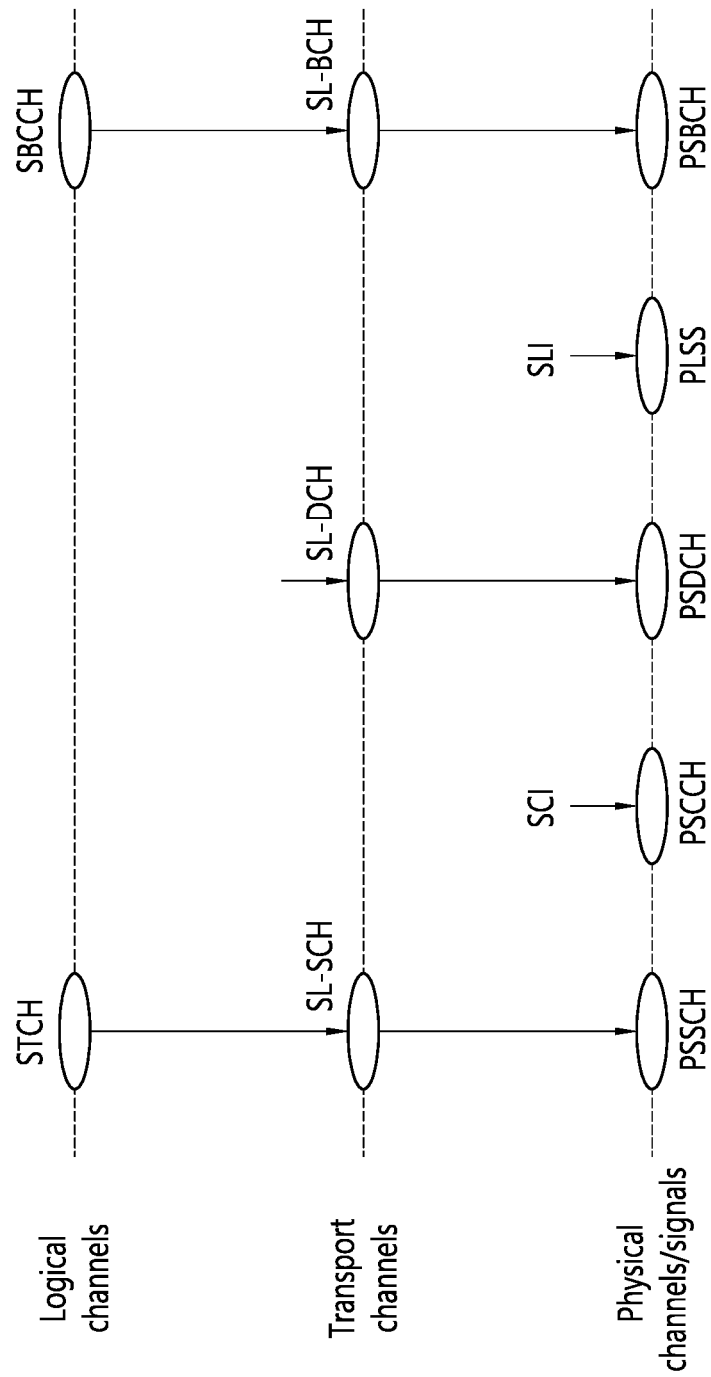
FIG. 9 shows an example of sidelink channel mapping to which technical features of the present disclosure can be applied.

FIG. 9 shows an example of sidelink channel mapping to which technical features of the present disclosure can be applied.

Referring to FIG. 9, sidelink logical channels may comprise sidelink traffic channel (STCH) and sidelink broadcast control channel (SBCCH). Sidelink transport channels may comprise sidelink shared channel (SL-SCH), sidelink discovery channel (SL-DCH), and sidelink broadcast channel (SL-BCH). Sidelink physical channels and/or signals may comprise physical sidelink shared channel (PSSCH), physical sidelink control channel (PSCCH), physical sidelink discovery channel (PSDCH), sidelink synchronization signal (SLSS), and physical sidelink broadcast channel (PSBCH).

The STCH carries user data for sidelink communication. The STCH is mapped to the SL-SCH which, in turn, is mapped to the PSSCH.

The PSCCH carries sidelink control information (SCI). The SCI contains sidelink scheduling information such as resource block assignment, modulation and coding scheme, and/or group destination ID.

The SL-DCH is used for discovery announcements. The SL-DCH is mapped to the PSDCH.

The SLSS is a physical signal, which is used to synchronize a sidelink communication between UE and peer UE. The SLSS is associated with a specific sidelink identity (SLI).

The SBCCH is mapped to the SL-BCH which, in turn, is mapped to the PSBCH. These channels are also used for sidelink synchronization, and comprise sidelink related system information. For example, the sidelink related system information may be referred to as sidelink master information block (SL-MIB).

Although not illustrated in FIG. 9, there might be other channel(s) such as sidelink feedback channel (SL-FCH) and/or physical sidelink feedback channel (PSFCH). These channels are used to carry sidelink feedback control information (SFCI) from a device receiving a sidelink transmission.

Figure 10:
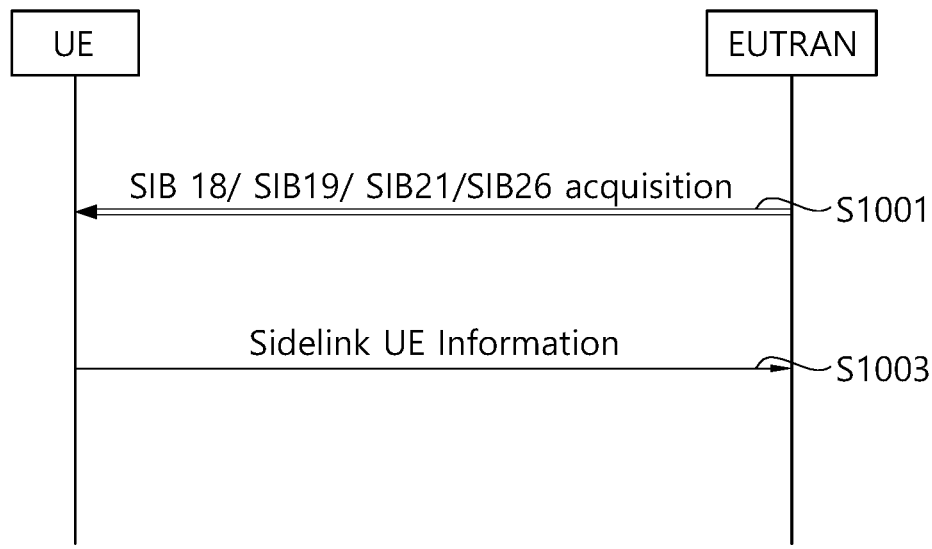
FIG. 10 shows an example of a transmission of sidelink UE information to which technical features of the present disclosure can be applied.

FIG. 10 shows an example of a transmission of sidelink UE information to which technical features of the present disclosure can be applied.

Referring to FIG. 10, in step S1001, a UE acquires at least one of system information block type (SIB) 18, SIB19, SIB 21 or SIB 26, from network. These SIBs may contain sidelink communication configuration. For example, SIB21 may contain V2X sidelink communication configuration.

In step S1003, the UE transmits SidelinkUEInformation message to the E-UTRAN. The SidelinkUEInformation may be used for an indication of sidelink information to the network (e.g., eNB and/or gNB).

The purpose of a transmission of sidelink UE information may be to inform the network that the UE is interested or no longer interested to receive sidelink communication or discovery, to receive V2X sidelink communication, as well as to request assignment or release of transmission resources for sidelink communication or discovery announcements or V2X sidelink communication or sidelink discovery gaps, to report parameters related to sidelink discovery from system information of inter-frequency/PLMN cells and to report the synchronization reference used by the UE for V2X sidelink communication.

A UE capable of sidelink communication or V2X sidelink communication or sidelink discovery that is in RRC_CONNECTED may initiate sidelink UE information transmission procedure to indicate that the UE is (interested in) receiving sidelink communication or V2X sidelink communication or sidelink discovery in several cases including upon successful connection establishment, upon change of interest, upon change to a PCell broadcasting SystemInformationBlockType18 or SystemInformationBlockType19 or SystemInformationBlockType21 including sl-V2X-ConfigCommon. A UE capable of sidelink communication or V2X sidelink communication or sidelink discovery may initiate the procedure to request assignment of dedicated resources for the concerned sidelink communication transmission or discovery announcements or V2X sidelink communication transmission or to request sidelink discovery gaps for sidelink discovery transmission or sidelink discovery reception and a UE capable of inter-frequency/PLMN sidelink discovery parameter reporting may initiate the procedure to report parameters related to sidelink discovery from system information of inter-frequency/PLMN cells.

A UE in RRC_IDLE that is configured to transmit sidelink communication/V2X sidelink communication/sidelink discovery announcements, while SystemInformationBlockType18/SystemInformationBlockType19/SystemInformationBlockType21 including sl-V2X-ConfigCommon or SystemInformationBlockType26 does not include the resources for transmission (in normal conditions), initiates connection establishment in accordance with section 5.3.3.1a of 3GPP TS36.331.

When the network directly allocates sidelink resources to more than one UE communicating with one or more other UEs for one-to-one communication or one-to-group communication, the network may need to identify all UEs involved in the one-to-one communication or one-to-group communication.

However, it is complicated for the network to identify all UEs in the group e.g. because some UEs may be in RRC_IDLE or RRC_INACTIVE or move among multiple cells. To reduce complexity and signalling overhead in the network, it is beneficial to allocate sidelink resources via a particular UE.

Therefore, in an embodiment of the present disclosure, a method for a first UE performing sidelink transmissions with one or more second UEs is described to address the above stated issues. The method may comprise the followings steps:

Step 1) The first UE receives one or more requests of sidelink resources from one or more second UEs;

Step 2) The first UE constructs an uplink message listing at least one of a request of sidelink resources corresponding to (or, related to/mapped to) the first UE with an identifier of the first UE or the one or more requests of sidelink resources with one or more identifiers of the second UEs;

According to various embodiments, different identifiers of the second UEs may correspond to different second UEs.

According to various embodiments, the request of sidelink resources may be a request received from a second UE.

According to various embodiments, the identifier of a second UE may be allocated by the first UE.

According to various embodiments, the identifier of a second UE may be an order of the listed request of sidelink resources in the message.

According to various embodiments, the request and identifier of the first UE may be listed at first and then the request and identifiers of the second UEs may be listed in the message.

Step 3) The first UE transmits the uplink message to the network and then receives a downlink message including more than two configurations from the network. Each configuration may include a configured grant and may be mapped to one of the identifiers.

According to various embodiments, each configured grant may correspond to a set of SPS (semi-persistent scheduling) resources used for sidelink transmissions.

According to various embodiments, the terms "configured grant", "SPS resource" and "SPS configured grant" may be used interchangeably. For example, the configured grant may refer to a set of periodic resources that can be used for a transmission when activated. The configured grant may be specified/indicated by, or determined based on, at least one of a time-frequency resource of the configured grant, a periodicity of the configured grant, or a timing offset (e.g., starting symbol offset) of the configured grant.

Step 4) The first UE activates the configured grant(s) corresponding to the identifier of the first UE upon receiving the downlink message or an activation command activating the configured grant(s). For example, the activation command can be resource through a MAC control element (MAC CE), or downlink control information (DCI).

Step 5) The first UE sends the received configuration(s) corresponding to an identifier to the second UE mapped to the identifier. Upon acquiring the configured grant(s) in the received configuration(s), the second UE activates the configured grant(s) and performs sidelink transmissions via the configured grant(s).

Figure 11:
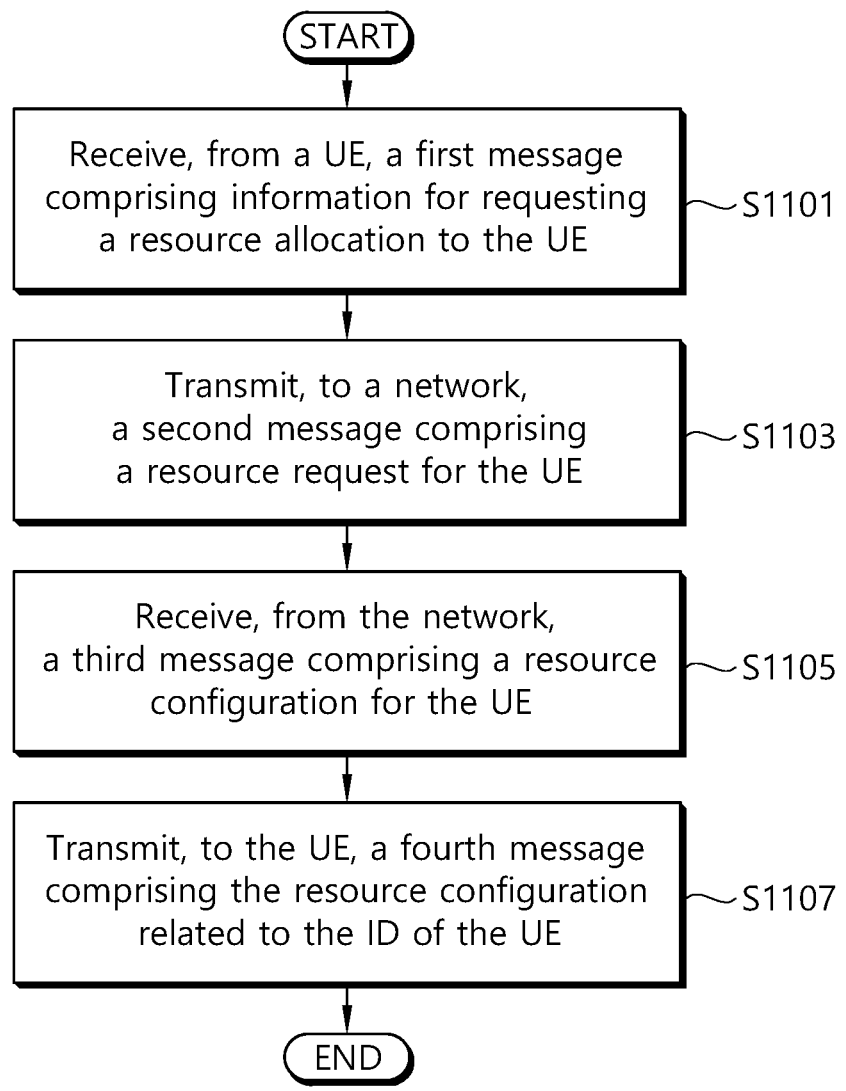
FIG. 11 shows an example of a method for resource allocation according to an embodiment of the present disclosure.

FIG. 11 shows an example of a method for resource allocation according to an embodiment of the present disclosure. The steps illustrated in FIG. 11 may be performed by a first wireless device.

Referring to FIG. 11, in step S1101, the first wireless device may receive, from a second wireless device, a first message comprising information for requesting a resource allocation to the second wireless device. The first message may comprise SidelinkUEInformation message, and the information for requesting a resource allocation to the second wireless device may comprises at least one of destinationInfoList field, carrierFreqCommTx field, v2x-typeTxsync field, or v2x-DestinationInfoList field.

In step S1103, the first wireless device may transmit, to a network, a second message comprising a resource request for the second wireless device. The second message may comprise SidelinkUEInformation message, and the resource request for the second wireless device comprises the information for requesting a resource allocation to the second wireless device and ID of the second wireless device allocated by the first wireless device. That is, the first wireless device may allocate the ID to the second wireless device, and can generate the second message comprising the information for requesting a resource allocation to the second wireless device, and the ID of the second wireless device. The resource request may be referred to as "SL-TXResourceReq". According to various embodiments, a resource request for a specific second wireless device may comprise information for requesting a resource allocation to the specific second wireless device, and ID of the specific second wireless device allocated by the first wireless device.

In step S1105, the first wireless device may receive, from the network, a third message comprising a resource configuration for the second wireless device. The third message may comprise RRC reconfiguration message, and the resource configuration for the second wireless device may comprise information for indicating a resource for the second wireless device related to the resource request, and the ID of the second wireless device. The resource configuration may be referred to as SPS configuration and/or SL-SPSConfiguredGrantConfig. According to various embodiments, the third message may comprise a plurality of resource configurations related to a plurality of second wireless devices, and each second wireless device may be related to one or more resource configurations.

In step S1107, the first wireless device may transmit, to the second wireless device, a fourth message comprising the resource configuration related to the ID of the second wireless device. The fourth message may comprise SL-reconfiguration message. Though not illustrated in FIG. 11, if the third message comprises a plurality of resource configurations related to the ID of the second wireless device, the fourth message may comprise the plurality of the resource configurations related to the ID of the second wireless device. Also, though not illustrated, if the third message comprises one or more resource configurations related to IDs of one or more other second wireless devices, the first wireless device may transmit to the one or more other second wireless devices the one or more resource configurations related to the IDs.

According to various embodiments, the second message may comprise a list of resource requests for one or more second wireless devices comprising the resource request for the second wireless device. The ID of the second wireless device may be determined based on an order of the resource request for the second wireless device in the list of resource requests.

According to various embodiments, the list of resource requests may comprise a resource request for the first wireless device, and the resource request for the first wireless device may be listed first in the list of the resource requests.

According to various embodiments, the resource for the second wireless device indicated by the information included in the resource configuration may be resources for the second wireless device to use for a transmission and/or resources related to a configured grant—that is the resources may be a set of periodic resources that can be used for a transmission when activated. For example, the information for indicating the resources for the second wireless device may comprise at least one of a time-frequency resource of the configured grant, a periodicity of the configured grant, or a timing offset of the configured grant. In other words, the resource configuration may comprise a configured grant that is specified/indicated by, or determined based on, at least one of a time-frequency resource of the configured grant, a periodicity of the configured grant, or a timing offset (e.g., starting symbol offset) of the configured grant. Also, the resource configuration may further comprises an index of the configured grant. According to various embodiments, such index may be referred to as "SPS index", and the index of the configured grant may be allocated by the network or the first wireless device.

According to various embodiments, the resource configuration may be included in an RRC message (e.g., SL-reconfiguration message), and the resource configuration may comprise a command for an activation of the configured grant related to the SPS index. That is, the configured grant can be activated by a RRC signalling which comprises a resource configuration related to the configured grant. According to the various embodiment, the second wireless device may activate the configured grant in response to receiving the resource configuration related to the configured grant. In this case, the command for an activation for the configured grant may not be included in the resource configuration and/or RRC signalling.

According to various embodiments, the first wireless device may transmit, to the second wireless device, an activation command comprising an SPS index and a command for an activation of a configured grant related to the SPS index, and receive, from the second wireless device, an activation confirmation comprising a confirmation for the activation of the configured grant and the SPS index related to the activated configured grant. The activation command may be transmitted through a MAC CE or SCI. The activation confirmation is received through a MAC CE or sidelink feedback control information (SFCI).

According to various embodiments, the first message may exclude the ID of the second wireless device and the second wireless device and/or a context of the second wireless device related to the ID may not be identified to the network. For example, an RRC state of the second wireless device may be an idle state (i.e., RRC_IDLE) or an inactive state (i.e., RRC_INACTIVE).

According to various embodiments, the first wireless device may generate the ID of the second wireless device based on a source upper layer ID related to the second wireless device, or a source layer-2 ID related to the second wireless device.

According to various embodiments, the first wireless device may receive, from the second wireless device, a fifth message comprising information regarding a traffic pattern of the second wireless device. The fifth message may comprise SPS-assistance-information message and the information regarding a traffic pattern of the second wireless device may comprise at least one of a traffic periodicity of traffic to be transmitted by the second wireless device, a timing offset related to the traffic, or a size of the traffic. Then, the first wireless device may transmit, to the network, a sixth message comprising traffic pattern information of the second wireless device. The sixth message may comprise SPS-assistance-information message, and the traffic pattern information of the second wireless device comprises the information regarding the traffic pattern of the second wireless device and the ID of the second wireless device. The information for indicating the resource for the second wireless device in the resource configuration may be determined based on the information regarding the traffic pattern.

According to various embodiments, the first wireless device may receive, from the second wireless device, a deactivation request comprising an SPS index and a request for a deactivation of a configured grant related to the SPS index, in response to a channel quality of a channel between the first wireless device and the second wireless device being less than a threshold. Then, the first wireless device may transmit, to the second wireless device, a deactivation confirmation comprising a confirmation for the deactivation of the configured grant and the SPS index related to the deactivated configured grant. The deactivation confirmation may also further comprise information indicating a deactivation of a configured grant of the first wireless device to the second wireless device. The first wireless device may also transmit, to the network, a deactivation indication comprising information indicating a deactivation of the configured grant and the SPS index related to the deactivated configured grant.

According to various embodiments, the first wireless device may receive, from the network, a deactivation command comprising an SPS a command a deactivation of a configured grant related to the SPS index. Then, the first wireless device may forward the deactivation command to the second wireless device, and receive, from the second wireless device, a deactivation confirmation comprising an SPS index and a confirmation for the deactivation of the configured grant related to the SPS index. The deactivation command may be received via a MAC CE, DCI, or an RRC signalling.

According to various embodiments, the first wireless device may include a base station performing a communication through a wireless backhaul, a second wireless device, a vehicle, a connected car, a drone, an AI module, a robot, an AR device, a VR device, an MR device, a hologram device, a public safety device, an MTC device, an IoT device, a medical device, a fin-tech device (or, a financial device) a security device, a climate/environmental device, a device related to 5G services, or a device related to the fourth industrial revolution. For example, the first wireless device may comprise a peer second wireless device communicating with the second wireless device via a sidelink.

According to various embodiments, the first wireless device may comprise a wired/wireless base station, or a UE. The second wireless device may comprise a wired/wireless base station, or a UE.

Figure 12:
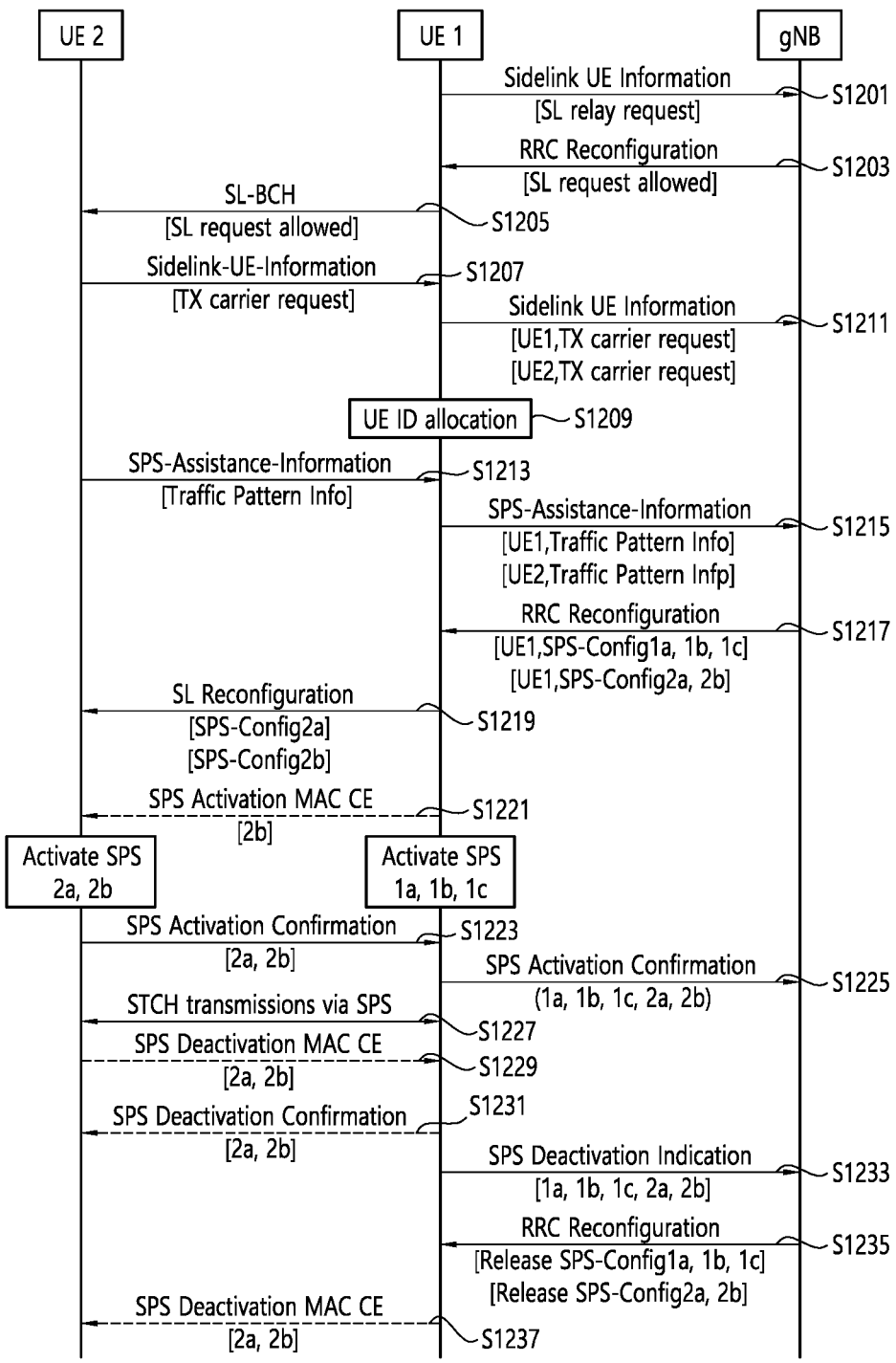
FIG. 12 shows an example of signalling a resource configuration according to an embodiment of a present disclosure.

FIG. 12 shows an example of signalling a resource configuration according to an embodiment of a present disclosure. In FIG. 12, UE1 and UE2 are illustrated, but they can be substituted for a first wireless device and a second wireless device, respectively.

Referring to FIG. 12, in step S1201, when UE1 is in RRC_CONNECTED, UE1 transmits, to the network (e.g., eNB and/or gNB) a first Sidelink UE Information message to request allowance of relaying sidelink control information. Upon receiving the first Sidelink UE Information message, the gNB determines whether UE1 is allowed to relay sidelink control information from/to the other UE(s) to/from the network, based on information received from the core network node such as mobility management entity (MME) and/or access and mobility management function (AMF).

In step S1203, if the UE1 is allowed to relay sidelink control information, the gNB indicates to the UE1 that relaying sidelink control information is allowed via, for example, RRC reconfiguration.

In step S1205, upon receiving the indication, UE1 broadcasts, to UEs including UE2, sidelink system information indicating that relaying sidelink control information is allowed, via SL-BCH. When UE2 is RRC_IDLE or RRC_INACTIVE or RRC_CONNECTED, UE2 receives the sidelink system information from UE1.

In step S1207, if UE2 wants to communicate with UE1 via sidelink, UE2 sends the second Sidelink UE Information message including TX sidelink resource request to UE1. For sending this message, UE2 performs Sidelink Mode 2 transmissions via a resource pool acquired from system information or pre-configuration. In Sidelink Mode 2, UE2 autonomously selects sidelink resources from the resource pool. Upon receiving the second Sidelink UE Information from UE2 and possibly the other UE(s), UE1 constructs the third Sidelink UE Information message to request sidelink TX resources for UE1 and UE2 and possibly the other UE(s).

According to various embodiments, sidelink mode 1 refers to a scheme in which a base station schedules, to devices, resources used for transmitting data or control information for a sidelink communication. The sidelink mode 1 may be applied to in-coverage scenarios.

According to various embodiments, sidelink mode 2 refers to a scheme in which a device autonomously selects resources in a resource pool for transmitting data or control information for a sidelink communication. The sidelink mode 2 may be applied to in-coverage scenario and/or out-of-coverage scenario.

In step S1209, UE1 may allocate UE identifiers for UE1 and UE2 and possible the other UE(s). The identifiers are allocated by UE1 either with explicit IDs or with the order in the list in the third Sidelink UE Information message. For example, UE1 may create the identifier of UE based on UE's Source upper layer ID or Source Layer-2 ID.

In step S1211, the UE1 may transmit the third Sidelink UE Information message to the gNB. The third Sidelink UE Information message lists up TX sidelink resource request constructed for UE1 with the UE1 identifier and TX sidelink resource request received from UE2 with the UE2 identifier. For example, the third Sidelink UE Information message includes the fourth Sidelink UE Information message constructed for UE1 with the UE1 identifier and the second Sidelink UE Information message received from UE2 with the UE2 identifier. An example of the third Sidelink UE Information message sent to gNB is shown in Table 3:

TABLE 3

SL-TxResourceReqList :=SEQUENCE (SIZE (1..maxSidelinkUE)) OF SL-TxResourceReqSL-TxResourceReq : =SEQUENCE {destinationInfoList-r12SL-DestinationInfoList-r12carrierFreqCommTx-r14INTEGER (0.. maxFreqV2X-1-r14)OPTIONAL,v2x-TypeTxSync-r14SL-TypeTxSync-r14OPTIONAL,v2x-DestinationInfoList-r14SL-DestinationInfoList-r12OPTIONALSidelink-UE-IDINTEGER(0..maxSidelinkUE-1)OPTIONAL - This ID is allocated by UE1}

According to Table 3, the third Sidelink UE information message may comprise SL-TxResourceReqList listing one or more SL-TxResourceReqs. Each SL-TxResourceReq may comprise destinationInfoList, carrierFreqCommTx, v2x-TypeTxSync, v2x-destinationInfoList, and/or Sidelink-UE-ID. The destinationInfoList indicates the destination(s) for relay or non-relay related one-to-one or one-to-many sidelink communication. The carrierFreqCommTx indicates the index of the frequency on which the UE is interested to transmit sidelink communication and/or V2X sidelink communication. The v2x-TypeTxSync indicates the synchronization reference used by the UE. The v2x-DestinationInfo-List indicates the destinations for V2X sidelink communication. The Sidelink-UE-ID indicates ID of UE related to the SL-TxResourceReq. According to various embodiments, IDs of UE1 and/or UE2 can be Sidelink-UE-ID, or the order in the SL-TxResourceReqList. That is, the ID of a UE can be determined based on an order or a SL-TxResourceReq related to the UE in the SL-TxResourceReqList. For example, SL-TxResourceReq corresponding to UE2 is listed with the UE2 identifier and constructed based on the second Sidelink UE Information message received from UE2.

In step S1213, UE2 sends UE2's SPS Assistance Information to UE1. UE2's SPS Assistance Information includes traffic pattern information constructed based on sidelink user traffic transmitted by UE2. For example, traffic pattern information may comprise at least one of a traffic periodicity of traffic to be transmitted by the UE2, a timing offset related to the traffic, or a size of the traffic.

Upon receiving UE2's SPS Assistance Information, UE1 constructs UE1's SPS Assistance Information. Then, UE1 constructs a SPS Assistance Information message including UE1's SPS Assistance Information with the previously allocated UE1 identifier and UE2's SPS Assistance Information with the previously allocated UE2 identifier, and in step S1215, the UE1 transmits, to the gNB, the SPS Assistance Information message constructed by the UE1. The identifiers can be explicit IDs (e.g. Sidelink-UE-ID) or the order in the TrafficPatternInfoList. For example, the IDs can be determined based on an order of the related traffic pattern information in the TrafficPatternInfoList. An example of the SPS Assistance information message sent to the gNB is shown in Table 4:

TABLE 4

TrafficPatternInfoList ::= SEQUENCE (SIZE (1..maxTrafficPattern)) OF
TrafficPatternInfoTrafficPatternInfo ::=SEQUENCE {Sidelink-UE-
IDINTEGER(0..maxSidelinkUE-1)OPTIONAL trafficPeriodicity-r14ENUMERATED {sf20,
sf50, sf100, sf200, sf300, sf400, sf500,sf600, sf700, sf800, sf900, sf1000},timingOffset-
r14INTEGER (0.. 10239),priorityInfoSL-r14SL-Priority-
r13OPTIONAL,logicalChannelIdentityUL-r14INTEGER (3..10)OPTIONAL,messageSize-
r14BIT STRING (SIZE (6))trafficDestination-r15SL-DestinationIdentity-
r12OPTIONAL,reliabilityInfoSL-r15SL-Reliability-r15OPTIONAL}

According to Table 4, the SPS Assistance Information message may comprise TrafficPatternrInfoList listing one or more TrafficPatternInfos. Each TrafficPatternInfo may comprise Sidelink-UE-ID, trafficPeriodicity, timingOffset, priorityInfoSL, LogicalChannelIdentityUL, messageSize, trafficDestination, and/or reliabilityInfoSL. The Sidelink-UE-ID indicates an ID of a UE related to TrafficPatternInfo comprising the Sidelink-UE-ID. The trafficPeriodicity indicates the estimated data arrival periodicity in a SL/UL logical channel. The timingOffset indicates the estimated timing for a packet arrival in a SL/UL logical channel. The periorityInfoSL indicates the traffic priority associated with the reported traffic pattern for sidelink communication and/or V2X sidelink communication. The LogicalChannelIdentityUL indicates the logical channel identity associated with the reported traffic pattern in the uplink logical channel. The messageSize indicates the maximum TB size based on the observed traffic pattern. The trafficDestination indicates the destination associated with the reported traffic pattern for sidelink communication and/or V2X sidelink communication. The reliabilityInfoSL indicates the traffic reliability associated with the reported traffic pattern for sidelink communication and/or V2X sidelink communication. In step S1217, upon receiving the SPS Assistance Information message from UE1, gNB sends multiple SPS configurations to UE1 via RRC Reconfiguration message. Each SPS configuration (e.g. SL-SPSConfiguredGrantConfig) includes a SPS configured grant with a UE identifier received from UE1, e.g. Sidelink-UE-ID and a SPS Index. Since the UE identifier is allocated by UE1, gNB may not understand context of a UE mapped to the UE identifier. Different SPS configurations have different SPS Indexes. An example of the RRC Reconfiguration message sent to the UE1 is shown in Table 5:

TABLE 5

SL-SPSConfiguredGrantConfigList ::= SEQUENCE (SIZE (1.. maxSidelinkUE)) OF SL-
SPSConfiguredGrantConfigSL-SPSConfiguredGrantConfig ::= SEQUENCE
{Sidelink-UE-IDINTEGER(0..maxSidelinkUE-1)OPTIONAL SPS-
IndexINTEGER(0..maxSPSIndex-1)OPTIONAL frequencyHopping
ENUMERATED {intraSlot, interSlot}
OPTIONAL, -- Need S, cg-DMRS-Configuration DMRS-
UplinkConfig, mcs-Table ENUMERATED {qam256,
qam64LowSE} OPTIONAL, -- Need S mcs-
TableTransformPrecoder ENUMERATED {qam256, qam64LowSE}
OPTIONAL, -- Need S uci-OnPUSCH SetupRelease
{ CG-UCI-OnPUSCH } OPTIONAL, --
Need M resourceAllocation ENUMERATED
{ resourceAllocationType0, resourceAllocationType1, dynamicSwitch }, rbg-Size
ENUMERATED {config2}
OPTIONAL, -- Need S powerControlLoopToUse ENUMERATED
{n0, n1}, p0-PUSCH-Alpha P0-PUSCH-AlphaSetId,
transformPrecoder ENUMERATED {enabled, disabled}
OPTIONAL, -- Need S nrofHARQ-Processes INTEGER(1..16),
repK ENUMERATED {n1, n2, n4, n8},
repK-RV ENUMERATED {s1-0231, s2-0303, s3-0000}
OPTIONAL, -- Need R periodicity ENUMERATED
{ sym2, sym7, sym1x14,
sym2x14, sym4x14, sym5x14, sym8x14, sym10x14, sym16x14, sym20x14,
sym32x14, sym40x14, sym64x14, sym80x14, sym128x14, sym160x14, sym256x14,
sym320x14, sym512x14,
sym640x14, sym1024x14, sym1280x14, sym2560x14, sym5120x14,
sym6, sym1x12, sym2x12, sym4x12, sym5x12, sym8x12, sym10x12, sym16x12, sym20x12,
sym32x12, sym40x12, sym64x12,
sym80x12, sym128x12, sym160x12, sym256x12, sym320x12, sym512x12, sym640x12,
sym1280x12, sym2560x12 }, configuredGrantTimer
INTEGER (1..64) OPTIONAL,
-- Need R rrc-ConfiguredSidelinkGrant SEQUENCE
{ timeDomainOffset INTEGER (0..5119),
timeDomainAllocation INTEGER (0..15),
frequencyDomainAllocation BIT STRING (SIZE(18)),
antennaPort INTEGER (0..31), dmrs-
SeqInitialization INTEGER (0..1)
OPTIONAL, -- Need R precodingAndNumberOfLayers
INTEGER (0..63), srs-ResourceIndicator INTEGER (0..15)
OPTIONAL, -- Need R mcsAndTBS
INTEGER (0..31), frequencyHoppingOffset INTEGER (1..
maxNrofPhysicalResourceBlocks-1) OPTIONAL, -- Need R
pathlossReferenceIndex INTEGER (0..maxNrofPUSCH-
PathlossReferenceRSs-1), ... }
OPTIONAL, -- Need R ...}

According to Table 5, the RRC Reconfiguration message may comprise SL-SPSConfiguredGrantConfigList listing one or more SL-SPSConfiguredGrantConfigs. Each SL-SPSConfiguredGrantConfig may comprise Sidelink-UE-ID, SPS-Index, and other fields related to information for indicating a resource for a UE related to the SL-SPSConfiguredGrantConfig. The Sidelink-UE-ID may indicate an ID of a UE related to the SL-SPSConfiguredGrantConfig comprising the Sidelink-UE-ID. The SPS-Index may indicate an index of the SL-SPSConfiguredGrantConfig and/or a configured grant. The information for indicating a resource for a UE may comprise at least one of a time-frequency resource of the configured grant, a periodicity of the configured grant, or a timing offset of the configured grant. That is, the SL-SPSConfiguredGrantConfig may comprise a configured grant that is specified/indicated by, or determined based on, at least one of a time-frequency resource of the configured grant, a periodicity of the configured grant, or a timing offset (e.g., starting symbol offset) of the configured grant. According to various embodiments, instead of gNB, the UE1 may alternatively allocate a SPS-Index to each SPS configured grant received from gNB. Then, UE1 may send UE2's SPS configured grant to UE2 with the corresponding SPS-Index allocated by UE1. In this case, the SL-SPSConfiguredGrantConfig in the RRC Reconfiguration message sent from the gNB to the UE1 may not comprise the SPS-Index, unlike illustrated in Table 5.

Upon receiving the RRC Reconfiguration message, UE1 activates the SPS configured grant(s) corresponding to the UE1 identifier e.g. SL-SPSConfiguredGrantConfig corresponding to the UE1 identifier. UE1 switches from Sidelink Mode 2 transmissions to Sidelink Mode 1 transmission. In Sidelink Mode 1 transmissions, UE1 uses sidelink grant allocated by gNB.

Alternatively, the UE1 may not activate the SPS configured grant corresponding to the UE1 ID upon receiving the RRC Reconfiguration message comprising the SPS configured grant corresponding to the UE1 ID. Instead, although it is not illustrated in FIG. 12, the UE1 may further receive an activation command comprising an SPS index and a command for activation of a SPS configured grant corresponding to the SPS index, and the UE1 may activate the SPS configured grant in response to receiving the activation command. According to various embodiments, the activation command may be received via DCI or MAC CE.

In step S1219, the UE1 sends the SPS configured grant(s) corresponding to the UE2 identifier to UE2 via the activated SPS configured grant, by sending one or more listed SL-SPSConfiguredGrantConfig corresponding to the UE2 identifier with the corresponding SPS-Index(es). Upon receiving the SPS configured grant(s) corresponding to the UE2 identifier, UE2 activates the SPS configured grant(s) and switches from Sidelink Mode 2 to Sidelink Mode 1.

Alternatively, after sending SPS configured grant(s), in step S1221, UE1 sends SPS Activation/Deactivation MAC Control Element indicating the corresponding SPS index(es) and activation to UE2. Upon receiving the MAC CE, UE2 activates the SPS configured grant(s) and switches from Sidelink Mode 2 to Sidelink Mode 1.

In step S1223, UE2 sends a SPS Activation/Deactivation Confirmation MAC Control Element indicating the corresponding SPS index(es) and activation confirmation to UE1 via Sidelink Mode 2 transmissions for indicating confirmation of the activation of the particular SPS configuration grant(s).

In step S1225, the UE1 sends SPS activation confirmation comprising SPS indexes related to activated configured grants of UE1 and/or UE2, and a configuration for an activation of the configured grants related to the SPS indexes.

In step S1227, the UE1 and the UE2 perform STCH transmission via SPS. The UE1 and UE2 transmit sidelink user traffic via the activated SPS configured grants.

In step S1229, the UE2 sends a SPS Activation/Deactivation MAC Control Element indicating the corresponding SPS index(es) and deactivation to UE1. For example, the UE2 may measure sidelink channel quality based on sidelink transmissions from UE1, and if the sidelink channel quality becomes below a threshold indicated by the network or UE1, UE2 sends a SPS Activation/Deactivation MAC Control Element indicating the corresponding SPS index(es) and deactivation to UE1.

In step S1231, upon receiving the SPS Activation/Deactivation MAC Control Element, UE1 sends the SPS Activation/Deactivation Confirmation MAC CE indicating the corresponding SPS index(es) and deactivation confirmation to UE2. The SPS Activation/Deactivation Confirmation MAC CE can also indicate deactivation of UE1's configured grant(s) to UE2. Upon receiving the SPS Activation/Deactivation Confirmation MAC CE from UE1, UE2 deactivates UE2's SPS configured grant(s) and then switches to Sidelink Mode 2 transmissions. Upon transmitting the SPS Activation/Deactivation Confirmation MAC CE to UE2, UE1 deactivates UE1's SPS configured grant(s) and then switches to Sidelink Mode 2 transmissions.

In step S1233, UE1 also sends SPS deactivation indication to gNB for indicating deactivation of UE1's SPS configured grant(s) and UE2's SPS configured grant(s) to gNB.

Alternatively, in step S1235, UE1 may receive a SPS Activation/Deactivation MAC CE indicating deactivation of one or more SPS configured grant(s) of UE2 or a RRC Reconfiguration indicating release of one or more SPS configured grant(s) of UE2 from gNB. Then, in step S1237, UE1 sends a SPS Activation/Deactivation MAC CE indicating deactivation of the UE2's SPS configured grant(s) deactivated or released by the gNB to UE2. Upon receiving the SPS Activation/Deactivation MAC CE from UE1, UE2 sends a SPS Activation/Deactivation Confirmation MAC CE indicating confirmation of the SPS configured grant(s) to UE1.

Figure 13:
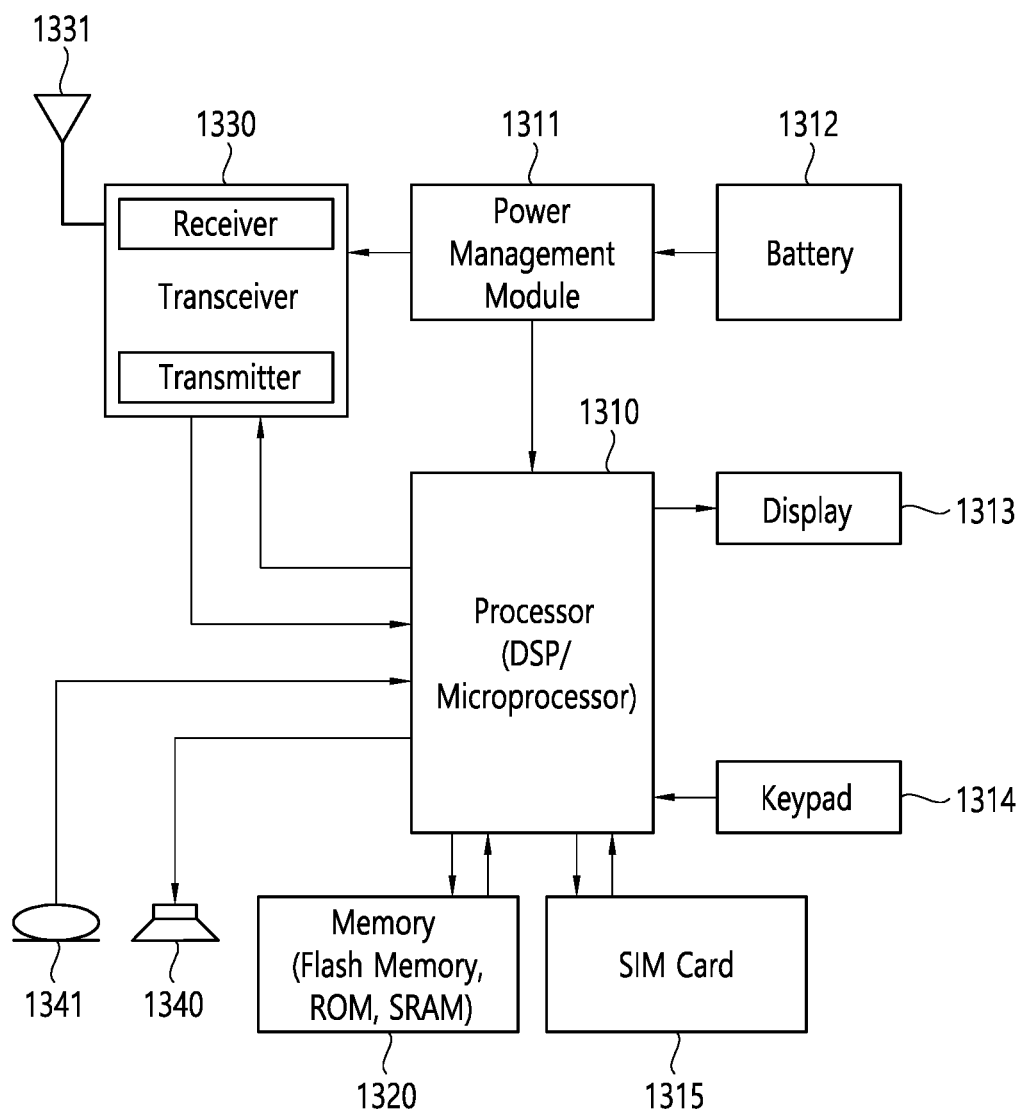
FIG. 13 shows a UE to implement an embodiment of the present disclosure.

FIG. 13 shows a UE to implement an embodiment of the present disclosure. The present disclosure described above for UE side may be applied to this embodiment.

A UE includes a processor 1310, a power management module 1311, a battery 1312, a display 1313, a keypad 1314, a subscriber identification module (SIM) card 1315, a memory 1320, a transceiver 1330, one or more antennas 1331, a speaker 1340, and a microphone 1341.

The processor 1310 may be configured to implement proposed functions, procedures and/or methods described in this description. Layers of the radio interface protocol may be implemented in the processor 1310. The processor 1310 may include application-specific integrated circuit (ASIC), other chipset, logic circuit and/or data processing device. The processor 1310 may be an application processor (AP). The processor 1310 may include at least one of a digital signal processor (DSP), a central processing unit (CPU), a graphics processing unit (GPU), a modem (modulator and demodulator). An example of the processor 1310 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The processor 1310 may be configured to, or configured to control one or more other components of the UE (e.g., a power management module 1311, a battery 1312, a display 1313, a keypad 1314, a subscriber identification module (SIM) card 1315, a memory 1320, a transceiver 1330, one or more antennas 1331, a speaker 1340, and/or a microphone 1341) to perform steps shown in FIGS. 10-12.

The power management module 1311 manages power for the processor 1310 and/or the transceiver 1330. The battery 1312 supplies power to the power management module 1311. The display 1313 outputs results processed by the processor 1310. The keypad 1314 receives inputs to be used by the processor 1310. The keypad 1314 may be shown on the display 1313. The SIM card 1315 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 1320 is operatively coupled with the processor 1310 and stores a variety of information to operate the processor 1310. The memory 1320 may include read-only memory (ROM), random access memory (RAM), flash memory, memory card, storage medium and/or other storage device. When the embodiments are implemented in software, the techniques described herein can be implemented with modules (e.g., procedures, functions, and so on) that perform the functions described herein. The modules can be stored in the memory 1320 and executed by the processor 1310. The memory 1320 can be implemented within the processor 1310 or external to the processor 1310 in which case those can be communicatively coupled to the processor 1310 via various means as is known in the art.

The transceiver 1330 is operatively coupled with the processor 1310, and transmits and/or receives a radio signal. The transceiver 1330 includes a transmitter and a receiver. The transceiver 1330 may include baseband circuitry to process radio frequency signals. The transceiver 1330 controls the one or more antennas 1331 to transmit and/or receive a radio signal.

The speaker 1340 outputs sound-related results processed by the processor 1310. The microphone 1341 receives sound-related inputs to be used by the processor 1310.

The present disclosure may be applied to various future technologies, such as AI, robots, autonomous-driving/self-driving vehicles, and/or extended reality (XR).

<AI>

AI refers to artificial intelligence and/or the field of studying methodology for making it. Machine learning is a field of studying methodologies that define and solve various problems dealt with in AI. Machine learning may be defined as an algorithm that enhances the performance of a task through a steady experience with any task.

An artificial neural network (ANN) is a model used in machine learning. It can mean a whole model of problem-solving ability, consisting of artificial neurons (nodes) that form a network of synapses. An ANN can be defined by a connection pattern between neurons in different layers, a learning process for updating model parameters, and/or an activation function for generating an output value. An ANN may include an input layer, an output layer, and optionally one or more hidden layers. Each layer may contain one or more neurons, and an ANN may include a synapse that links neurons to neurons. In an ANN, each neuron can output a summation of the activation function for input signals, weights, and deflections input through the synapse. Model parameters are parameters determined through learning, including deflection of neurons and/or weights of synaptic connections. The hyper-parameter means a parameter to be set in the machine learning algorithm before learning, and includes a learning rate, a repetition number, a mini batch size, an initialization function, etc. The objective of the ANN learning can be seen as determining the model parameters that minimize the loss function. The loss function can be used as an index to determine optimal model parameters in learning process of ANN.

Machine learning can be divided into supervised learning, unsupervised learning, and reinforcement learning, depending on the learning method. Supervised learning is a method of learning ANN with labels given to learning data. Labels are the answers (or result values) that ANN must infer when learning data is input to ANN. Unsupervised learning can mean a method of learning ANN without labels given to learning data. Reinforcement learning can mean a learning method in which an agent defined in an environment learns to select a behavior and/or sequence of actions that maximizes cumulative compensation in each state.

Machine learning, which is implemented as a deep neural network (DNN) that includes multiple hidden layers among ANN, is also called deep learning. Deep learning is part of machine learning. In the following, machine learning is used to mean deep learning.

Figure 14:
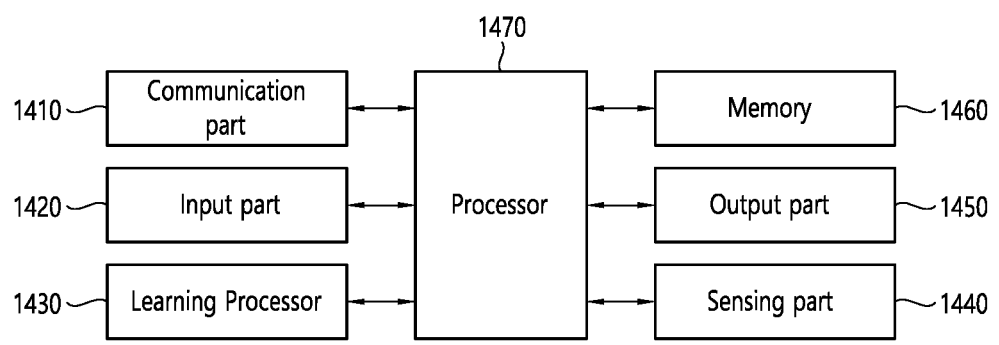
FIG. 14 shows an example of an AI device to which the technical features of the present disclosure can be applied.

FIG. 14 shows an example of an AI device to which the technical features of the present disclosure can be applied.

The AI device 1400 may be implemented as a stationary device or a mobile device, such as a TV, a projector, a mobile phone, a smartphone, a desktop computer, a notebook, a digital broadcasting terminal, a PDA, a PMP, a navigation device, a tablet PC, a wearable device, a set-top box (STB), a digital multimedia broadcasting (DMB) receiver, a radio, a washing machine, a refrigerator, a digital signage, a robot, a vehicle, etc.

Referring to FIG. 14, the AI device 1400 may include a communication part 1410, an input part 1420, a learning processor 1430, a sensing part 1440, an output part 1450, a memory 1460, and a processor 1470.

The communication part 1410 can transmit and/or receive data to and/or from external devices such as the AI devices and the AI server using wire and/or wireless communication technology. For example, the communication part 1410 can transmit and/or receive sensor information, a user input, a learning model, and a control signal with external devices. The communication technology used by the communication part 1410 may include a global system for mobile communication (GSM), a code division multiple access (CDMA), an LTE/LTE-A, a 5G, a WLAN, a Wi-Fi, Bluetooth™, radio frequency identification (RFID), infrared data association (IrDA), ZigBee, and/or near field communication (NFC).

The input part 1420 can acquire various kinds of data. The input part 1420 may include a camera for inputting a video signal, a microphone for receiving an audio signal, and a user input part for receiving information from a user. A camera and/or a microphone may be treated as a sensor, and a signal obtained from a camera and/or a microphone may be referred to as sensing data and/or sensor information. The input part 1420 can acquire input data to be used when acquiring an output using learning data and a learning model for model learning. The input part 1420 may obtain raw input data, in which case the processor 1470 or the learning processor 1430 may extract input features by preprocessing the input data.

The learning processor 1430 may learn a model composed of an ANN using learning data. The learned ANN can be referred to as a learning model. The learning model can be used to infer result values for new input data rather than learning data, and the inferred values can be used as a basis for determining which actions to perform. The learning processor 1430 may perform AI processing together with the learning processor of the AI server. The learning processor 1430 may include a memory integrated and/or implemented in the AI device 1400. Alternatively, the learning processor 1430 may be implemented using the memory 1460, an external memory directly coupled to the AI device 1400, and/or a memory maintained in an external device.

The sensing part 1440 may acquire at least one of internal information of the AI device 1400, environment information of the AI device 1400, and/or the user information using various sensors. The sensors included in the sensing part 1440 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a light detection and ranging (LIDAR), and/or a radar.

The output part 1450 may generate an output related to visual, auditory, tactile, etc. The output part 1450 may include a display unit for outputting visual information, a speaker for outputting auditory information, and/or a haptic module for outputting tactile information.

The memory 1460 may store data that supports various functions of the AI device 1400. For example, the memory 1460 may store input data acquired by the input part 1420, learning data, a learning model, a learning history, etc.

The processor 1470 may determine at least one executable operation of the AI device 1400 based on information determined and/or generated using a data analysis algorithm and/or a machine learning algorithm. The processor 1470 may then control the components of the AI device 1400 to perform the determined operation. The processor 1470 may request, retrieve, receive, and/or utilize data in the learning processor 1430 and/or the memory 1460, and may control the components of the AI device 1400 to execute the predicted operation and/or the operation determined to be desirable among the at least one executable operation. The processor 1470 may generate a control signal for controlling the external device, and may transmit the generated control signal to the external device, when the external device needs to be linked to perform the determined operation. The processor 1470 may obtain the intention information for the user input and determine the user's requirements based on the obtained intention information. The processor 1470 may use at least one of a speech-to-text (STT) engine for converting speech input into a text string and/or a natural language processing (NLP) engine for acquiring intention information of a natural language, to obtain the intention information corresponding to the user input. At least one of the STT engine and/or the NLP engine may be configured as an ANN, at least a part of which is learned according to a machine learning algorithm. At least one of the STT engine and/or the NLP engine may be learned by the learning processor 1430 and/or learned by the learning processor of the AI server, and/or learned by their distributed processing. The processor 1470 may collect history information including the operation contents of the AI device 1400 and/or the user's feedback on the operation, etc. The processor 1470 may store the collected history information in the memory 1460 and/or the learning processor 1430, and/or transmit to an external device such as the AI server. The collected history information can be used to update the learning model. The processor 1470 may control at least some of the components of AI device 1400 to drive an application program stored in memory 1460. Furthermore, the processor 1470 may operate two or more of the components included in the AI device 1400 in combination with each other for driving the application program.

Figure 15:
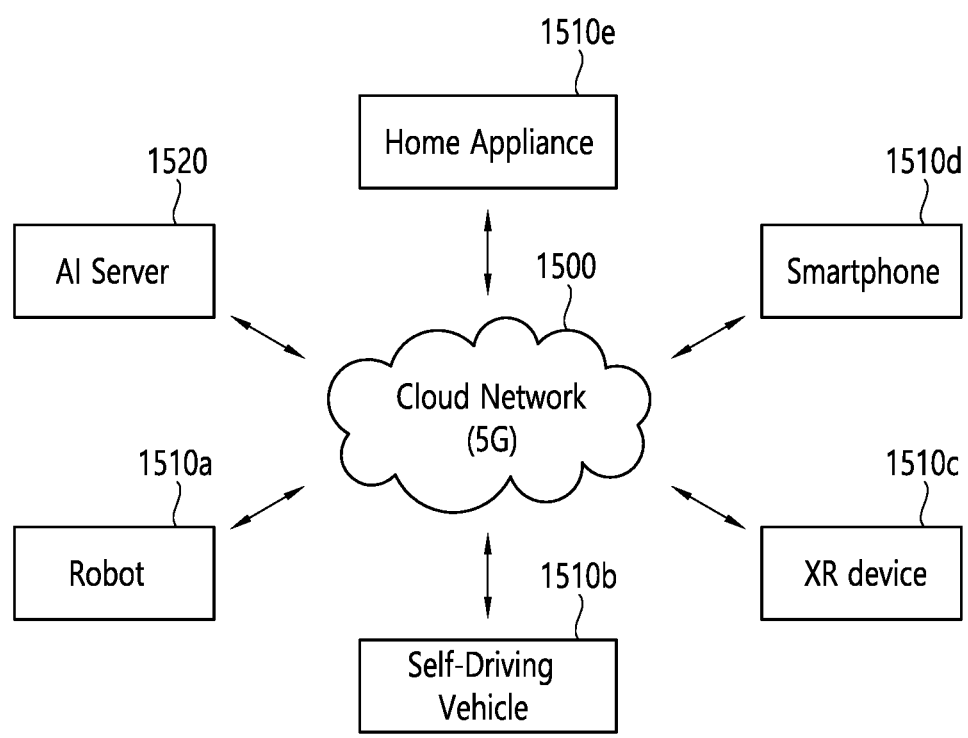
FIG. 15 shows an example of an AI system to which the technical features of the present disclosure can be applied.

FIG. 15 shows an example of an AI system to which the technical features of the present disclosure can be applied.

Referring to FIG. 15, in the AI system, at least one of an AI server 1520, a robot 1510a, an autonomous vehicle 1510b, an XR device 1510c, a smartphone 1510d and/or a home appliance 1510e is connected to a cloud network 1500. The robot 1510a, the autonomous vehicle 1510b, the XR device 1510c, the smartphone 1510d, and/or the home appliance 1510e to which the AI technology is applied may be referred to as AI devices 1510a to 1510e.

The cloud network 1500 may refer to a network that forms part of a cloud computing infrastructure and/or resides in a cloud computing infrastructure. The cloud network 1500 may be configured using a 3G network, a 4G or LTE network, and/or a 5G network. That is, each of the devices 1510a to 1510e and 1520 consisting the AI system may be connected to each other through the cloud network 1500. In particular, each of the devices 1510a to 1510e and 1520 may communicate with each other through a base station, but may directly communicate with each other without using a base station.

The AI server 1520 may include a server for performing AI processing and a server for performing operations on big data. The AI server 1520 is connected to at least one or more of AI devices constituting the AI system, i.e. the robot 1510a, the autonomous vehicle 1510b, the XR device 1510c, the smartphone 1510d and/or the home appliance 1510e through the cloud network 1500, and may assist at least some AI processing of the connected AI devices 1510a to 1510e. The AI server 1520 can learn the ANN according to the machine learning algorithm on behalf of the AI devices 1510a to 1510e, and can directly store the learning models and/or transmit them to the AI devices 1510a to 1510e. The AI server 1520 may receive the input data from the AI devices 1510a to 1510e, infer the result value with respect to the received input data using the learning model, generate a response and/or a control command based on the inferred result value, and transmit the generated data to the AI devices 1510a to 1510e. Alternatively, the AI devices 1510a to 1510e may directly infer a result value for the input data using a learning model, and generate a response and/or a control command based on the inferred result value.

Various embodiments of the AI devices 1510a to 1510e to which the technical features of the present disclosure can be applied will be described. The AI devices 1510a to 1510e shown in FIG. 15 can be seen as specific embodiments of the AI device 1400 shown in FIG. 14.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a first wireless device in a wireless communication system, the method comprising:

receiving, from a second first wireless device, a first message comprising information for requesting a resource allocation to the second wireless device;

transmitting, to a network, a second message comprising a resource request for the second wireless device, the resource request comprising the information and an identifier (ID) of the second wireless device allocated by the first wireless device;

receiving, from the network, a third message comprising a resource configuration for the second wireless device, the resource configuration comprising information for a resource for the second wireless device related to the resource request, and the ID of the second wireless device;

transmitting, to the second wireless device, a fourth message comprising the resource configuration related to the ID of the second wireless device;

receiving, from the second wireless device, a fifth message comprising information regarding a traffic pattern for the second wireless device; and transmitting, to the network, a sixth message comprising traffic pattern information for the second wireless device, wherein the traffic pattern information for the second wireless device comprises the information regarding the traffic pattern for the second wireless device and the ID of the second wireless device, wherein the information regarding the traffic pattern comprises at least one of a traffic periodicity of traffic for the second wireless device, a timing offset related to the traffic, or a size of the traffic, wherein the information for the resource for the second wireless device is determined based on the information regarding the traffic pattern, wherein the second message comprises a list of resource requests for one or more second wireless devices comprising the resource request for the second wireless device, wherein the resource configuration is included in a radio resource control (RRC) message, and wherein the resource configuration comprises at least one of:
an index of the configured grant;
a time-frequency of a configured grant;
a periodicity of the configured grant; or
a timing offset of the configured grant.

2. The method of claim 1,
wherein the ID of the second wireless device is determined based on an order of the resource request for the second wireless device in the list of resource requests.

3. The method of claim 2, wherein the list of resource requests comprises a resource request for the first wireless device, and
wherein the resource request for the first wireless device is listed first in the list of the resource requests.

4. The method of claim 1,
wherein the resource configuration comprises a command for an activation of the configured grant related to the index.

5. The method of claim 1, further comprising:
transmitting, to the second wireless device, an activation command comprising an index of a configured grant and a command for an activation of the configured grant related to the index; and
receiving, from the second wireless device, an activation confirmation comprising the index of the configured grant and a confirmation for the activation of the configured grant related to the index,
wherein the activation command is transmitted through a media access control (MAC) control element (CE) or sidelink control information (SCI), and
wherein the activation confirmation is received through a MAC CE or sidelink feedback control information (SFCI).

6. The method of claim 1, wherein the first message excludes the ID of the second wireless device, and wherein a context of the second wireless device related to the ID of the second wireless device is not identified to the network.

7. The method of claim 1, wherein a radio resource control (RRC) state of the second wireless device is an idle state or an inactive state.

8. The method of claim 1, further comprising:
generating the ID of the second wireless device based on a source upper layer ID related to the second wireless device, or a source layer-2 ID related to the second wireless device.

9. The method of claim 1, further comprising:
receiving, from the second wireless device, a deactivation request comprising an index of a configured grant and a request for a deactivation of the configured grant related to the index, in response to a channel quality of a channel between the first wireless device and the second wireless device being less than a threshold;
transmitting, to the second wireless device, a deactivation confirmation comprising the index of the configured grant and a confirmation for the deactivation of the configured grant related to the index; and
transmitting, to the network, a deactivation indication comprising the index of the configured grant and information for a deactivation of the configured grant related to the index.

10. The method of claim 1, further comprising:
receiving, from the network, a deactivation command comprising an index of a configured grant and a command for a deactivation of the configured grant related to the index;
transmitting, to the second wireless device, the deactivation command; and
receiving, from the second wireless device, a deactivation confirmation comprising the index of the configured grant and a confirmation for the deactivation of the configured grant related to the index,
wherein the deactivation command is received via a media access control (MAC) control element (MAC CE), downlink control information (DCI), or a radio resource control (RRC) signaling.

11. The method of claim 1, wherein the first wireless device comprises a peer second wireless device communicating with the second wireless device via a sidelink.

12. A first wireless device in a wireless communication system, comprising:
a memory;
a transceiver; and
at least one processor, operatively coupled to the memory and the transceiver,
wherein the memory stores instructions that, based on being executed by the at least one processor, perform operations comprising:
receiving, from a second first wireless device, a first message comprising information for requesting a resource allocation to the second wireless device;
transmitting, to a network, a second message comprising a resource request for the second wireless device, the resource request comprising the information and an identifier (ID) of the second wireless device allocated by the first wireless device;
receiving, from the network, a third message comprising a resource configuration for the second wireless device, the resource configuration comprising information for a resource for the second wireless device related to the resource request, and the ID of the second wireless device;
transmitting, to the second wireless device, a fourth message comprising the resource configuration related to the ID of the second wireless device;

receiving, from the second wireless device, a fifth message comprising information regarding a traffic pattern for the second wireless device; and transmitting, to the network, a sixth message comprising traffic pattern information for the second wireless device, wherein the traffic pattern information for the second wireless device comprises the information regarding the traffic pattern for the second wireless device and the ID of the second wireless device, wherein the information regarding the traffic pattern comprises at least one of a traffic periodicity of traffic for the second wireless device, a timing offset related to the traffic, or a size of the traffic, wherein the information for the resource for the second wireless device is determined based on the information regarding the traffic pattern, wherein the second message comprises a list of resource requests for one or more second wireless devices comprising the resource request for the second wireless device, wherein the resource configuration is included in a radio resource control (RRC) message, and wherein the resource configuration comprises at least one of:

an index of the configured grant;

a time-frequency of a configured grant;

a periodicity of the configured grant; or a timing offset of the configured grant.

13. The first wireless device of claim 12, wherein the first message excludes the ID of the second wireless device, and wherein a context of the second wireless device related to the ID of the second wireless device is not identified to the network.

* * * * *